(12) United States Patent
Koyabu et al.

(10) Patent No.: US 7,751,687 B2
(45) Date of Patent: Jul. 6, 2010

(54) DATA PROCESSING APPARATUS, DATA PROCESSING METHOD, DATA PROCESSING SYSTEM, PROGRAM, AND STORAGE MEDIUM

(75) Inventors: Kyohei Koyabu, Kanagawa (JP); Shojiro Shibata, Kanagawa (JP); Shuji Tsunashima, Tokyo (JP); Mototsugu Takamura, Kanagawa (JP); Shinjiro Kakita, Kanagawa (JP)

(73) Assignee: Sony Corporation, Tokyo (JP)

( * ) Notice: Subject to any disclaimer, the term of this patent is extended or adjusted under 35 U.S.C. 154(b) by 1289 days.

(21) Appl. No.: 11/256,923

(22) Filed: Oct. 25, 2005

(65) Prior Publication Data

US 2006/0093322 A1    May 4, 2006

(30) Foreign Application Priority Data

Oct. 26, 2004 (JP) ............................ P2004-311594
Aug. 24, 2005 (JP) ............................ P2005-243290

(51) Int. Cl.
*H04N 5/91* (2006.01)
*H04N 7/26* (2006.01)
*G11B 5/09* (2006.01)
*G11B 7/00* (2006.01)
*G11B 20/18* (2006.01)

(52) U.S. Cl. ............................ 386/68; 386/69; 386/109; 369/47.29; 369/47.32; 369/47.39; 369/47.41; 369/53.3; 369/53.31; 369/53.35; 369/53.37; 369/124.04; 369/124.14

(58) Field of Classification Search .................. 386/68, 386/69, 109, E5.052, E9.013; 369/47.29, 369/47.32, 47.41, 53.31, 53.35, 124.04, 124.14, 369/47.39, 53.3, 53.37; 375/E7.004, E7.023, 375/E7.024, E7.025, E7.148, E7.18, E7.198, 375/E7.211, E7.224; G9B/7.099, 19.001, G9B/19.017, 19.042, 19.046, 20.009, 20.014, G9B/20.049, 27.052, 19.005

See application file for complete search history.

(56) References Cited

U.S. PATENT DOCUMENTS 5,414,686 A * 5/1995 Iitsuka .................... 369/47.29

(Continued)

FOREIGN PATENT DOCUMENTS

JP          10-261075        9/1998

(Continued)

OTHER PUBLICATIONS

U.S. Appl. No. 11/256,923, filed Oct. 25, 2005, Publication No. 2006/0093322, Koyabu, et al.

(Continued)

*Primary Examiner*—Thai Tran
*Assistant Examiner*—Syed Y Hasan
(74) *Attorney, Agent, or Firm*—Oblon, Spivak, McClelland, Maier & Neustadt, L.L.P.

(57) ABSTRACT

A data processing apparatus for outputting a plurality of picture data forming reproduced data to a reproduction apparatus for reproduction, the data processing apparatus having a processing circuit for judging if the reproduction rate of the picture data by the reproduction apparatus is slower than a transfer rate for transferring the picture data to the reproduction apparatus and outputting all of the picture data forming the reproduced data to the reproduction apparatus when judging as a result of the judgment that the reproduction rate is slower than the transfer rate.

12 Claims, 20 Drawing Sheets

U.S. PATENT DOCUMENTS

| | | | |
|---|---|---|---|
| 5,535,008 A * | 7/1996 | Yamagishi et al. | 386/109 |
| 5,596,558 A * | 1/1997 | Arataki et al. | 369/53.18 |
| 6,870,802 B1 * | 3/2005 | Kimura et al. | 369/47.41 |
| 7,289,721 B1 * | 10/2007 | Fukushima et al. | 386/96 |
| 2001/0026677 A1 * | 10/2001 | Chen et al. | 386/68 |
| 2002/0024902 A1 * | 2/2002 | Sasaki | 369/47.39 |
| 2004/0233825 A1 * | 11/2004 | Ishibashi et al. | 369/116 |

FOREIGN PATENT DOCUMENTS

| | | |
|---|---|---|
| JP | 11-275518 | 10/1999 |
| JP | 2001-54066 | 2/2001 |
| JP | 2003-309811 | 10/2003 |
| JP | 2004-40580 | 2/2004 |

OTHER PUBLICATIONS

U.S. Appl. No. 12/633,457, filed Dec. 8, 2009, Shibata, et al.

* cited by examiner

FIG. 3

TCN TRANSFER COMPLETION NOTIFICATION

IDENTIFICATION DATA OF GOP

ADDRESS IN INPUT MEMORY WHERE GOP IS WRITTEN

DATA SIZE OF GOP

FIG. 7A

I PICTURE DATA, P PICTURE DATA, B PICTURE DATA
←─────────────────────────────────────────

PRIORITY   H                                            L

FIG. 7B   REPRODUCTION RATE
          L (LOW SPEED)

I PICTURE DATA, P PICTURE DATA, B PICTURE DATA
    I PICTURE DATA, P PICTURE DATA, B PICTURE DATA PARTIAL
    P PICTURE DATA, P PICTURE DATA
    I PICTURE DATA, P PICTURE DATA PARTIAL
    I PICTURE DATA
    I PICTURE DATA PARTIAL

H (HIGH SPEED)

DATA PROCESSING APPARATUS, DATA PROCESSING METHOD, DATA PROCESSING SYSTEM, PROGRAM, AND STORAGE MEDIUM

CROSS REFERENCES TO RELATED APPLICATIONS

The present invention contains subject matter related to Japanese Patent Application No. 2004-311594 filed in the Japan Patent Office on Oct. 26, 2004, and Japanese Patent Application No. 2005-243290 filed in the Japan Patent Office on Aug. 24, 2005, the entire contents of which being incorporated herein by reference.

BACKGROUND OF THE INVENTION

1. Field of the Invention

The present invention relates to a data processing apparatus, data processing method, data processing system, program, and storage medium for example for outputting a plurality of picture data forming reproduced data to a reproduction apparatus for reproduction.

2. Description of the Related Art

For example, there is a system which outputs reproduced data comprised of a plurality of picture data encoded by the MPEG (Moving Picture Experts Group) scheme from a computer (data processing apparatus) to a reproduction apparatus for reproduction (for example, see Japanese Patent Publication (A) No. 2004-215185). In a general system, for example when the reproduction apparatus performs 1× speed reproduction, the data processing apparatus outputs the reproduced data required for 1× speed reproduction. Further, for example, when the reproduction apparatus performs 3× speed reproduction, even when the reproduction rate is slower than the data transfer rate to the reproduction apparatus, the data processing apparatus outputs only the data required for the 3× speed reproduction in the reproduced data to the reproduction apparatus.

However, for example, when slowing from 3× speed reproduction to 1× speed reproduction, the reproduction apparatus obtains the amount of data required for the 3× speed reproduction, but does not obtain the data required for 1× speed reproduction, so it is necessary to again transfer the data required for 1× speed reproduction from the data processing apparatus to the reproduction apparatus and therefore instantaneous slow motion reproduction is difficult. That is, there is the disadvantage of a poor response in slow motion reproduction.

SUMMARY OF THE INVENTION

An object of the present invention is to provide a data processing apparatus, data processing method, data processing system, program, and storage medium able to improve the response in slow motion reproduction when outputting a plurality of picture data forming the reproduced data from a data processing apparatus to a reproduction apparatus for reproduction at the reproduction apparatus and the reproduction rate is slower than the transfer rate.

To achieve this object, according to a first aspect of the invention, there is provided a data processing apparatus for outputting a plurality of picture data forming reproduced data to a reproduction apparatus for reproduction, the data processing apparatus comprising a processing circuit for judging if the reproduction rate of the picture data by the reproduction apparatus is slower than a transfer rate for transferring the picture data to the reproduction apparatus and outputting all of the picture data forming the reproduced data to the reproduction apparatus when judging as a result of the judgment that the reproduction rate is slower than the transfer rate.

The action of the first aspect of the invention is as follows: The data processing apparatus outputs the plurality of picture data forming the reproduced data to the reproduction apparatus. The processing means of the data processing apparatus judges if the reproduction rate of the picture data by the reproduction apparatus is slower than the transfer rate of transfer of picture data to the reproduction apparatus. When judging as a result of the judgment that the reproduction rate is slower than the transfer rate, it outputs all of the picture data forming the reproduced data to the reproduction apparatus.

According to a second aspect of the invention, there is provided a data processing method outputting a plurality of picture data forming reproduced data to a reproduction apparatus for reproduction, the data processing method of a data processing apparatus comprising a first step of judging if a reproduction rate of the picture data by the reproduction apparatus is slower than a transfer rate of transfer of the picture data to the reproduction apparatus and a second step of outputting all of the picture data forming the reproduced data to the reproduction apparatus when judging as a result of judgment by the first step that the reproduction rate is slower than the transfer rate.

According to a third aspect of the invention, there is provided a data processing system having a data processing apparatus output a plurality of picture data forming reproduced data to a reproduction apparatus for reproduction, where the computer data processing apparatus judges if a reproduction rate of the picture data by the reproduction apparatus is slower than a transfer rate when outputting the picture data to the reproduction apparatus and outputs all of the picture data forming the reproduced data to the reproduction apparatus when the result of the judgment is that the reproduction rate is slower than the transfer rate, and the reproduction apparatus comprises an input memory and a means for writing the picture data input from the data processing apparatus to the input memory, decoding the picture data read from the input memory, and reproducing it by the reproduction rate.

The action of the third aspect of the invention is as follows: The data processing apparatus judges if the reproduction rate of the picture data by the reproduction apparatus is slower than the transfer rate at the time of outputting the picture data to the reproduction apparatus and outputs all of the picture data forming the reproduced data when the result of the judgment is that the reproduction rate is slower than the transfer rate. Further, the reproduction apparatus writes the picture data input by the reproducing means to the data processing apparatus into the input memory and decodes picture data read from the input memory and reproduces it by the reproduction rate.

According to a fourth aspect of the invention, there is provided a program to be executed by a data processing apparatus for outputting a plurality of picture data forming reproduced data to a reproduction apparatus for reproduction, comprising a first routine of judging if a reproduction rate of the picture data by the reproduction apparatus is slower than a transfer rate of transfer of the picture data to the reproduction apparatus and a second routine of outputting all of the picture data forming the reproduced data to the reproduction apparatus when the result of judgment by the first routine is that the reproduction rate is slower than the transfer rate.

According to a fifth aspect of the invention, there is provided a storage medium storing a program to be executed by a data processing apparatus for outputting a plurality of picture data forming reproduced data to a reproduction apparatus for reproduction, the program comprising a first routine of judging if a reproduction rate of the picture data by the reproduction apparatus is slower than a transfer rate of transfer of the picture data to the reproduction apparatus and a second routine of outputting all of the picture data forming the reproduced data to the reproduction apparatus when the result of judgment by the first routine is that the reproduction rate is slower than the transfer rate.

According to a sixth aspect of the invention, there is provided a data processing apparatus outputting a plurality of picture data forming reproduced data to a reproducing means for reproduction, comprising a storage means for storing the reproduced data, a processing circuit judging if a reproduction rate of the picture data by the reproducing means is slower than a transfer rate at the time of outputting the picture data read from the storage means to the reproducing means and outputting all of the picture data forming the reproduced data to the reproducing means when the result of the judgment is that the reproduction rate is slower than the transfer rate, and a reproducing means for writing picture data output from the processing circuit into an input memory, decoding the picture data read from the input memory, and reproducing at by the reproduction rate.

According to the present invention, it is possible to provide a data processing apparatus, data processing method, data processing system, program, and storage medium able to output a plurality of picture data forming reproduced data from a data processing apparatus to a reproduction apparatus, reproduce the data at the reproduction apparatus, and improve the response of the slow motion reproduction when the reproduction rate is slower than the transfer rate.

BRIEF DESCRIPTION OF THE DRAWINGS

These and other objects and features of the present invention will become clearer from the following description of the preferred embodiments given with reference to the attached drawings, wherein:

FIG. 3 is a view for explaining a transfer completion notification output from the computer shown in FIG. 1 to a reproduction apparatus;

FIG. 7 gives views for explaining the priority order of data when a computer of the data processing system shown in FIG. 1 transfers data to a reproduction apparatus, where FIG. 7A is a view for explaining a specific example of the priorities of I, P, and B picture data, while FIG. 7B is a view for explaining a specific example of a mode of output in accordance with the priorities of the I, P, and B picture data;

DESCRIPTION OF THE PREFERRED EMBODIMENTS

Below, data processing systems according to embodiments of the present invention will be explained.

Figure 1:
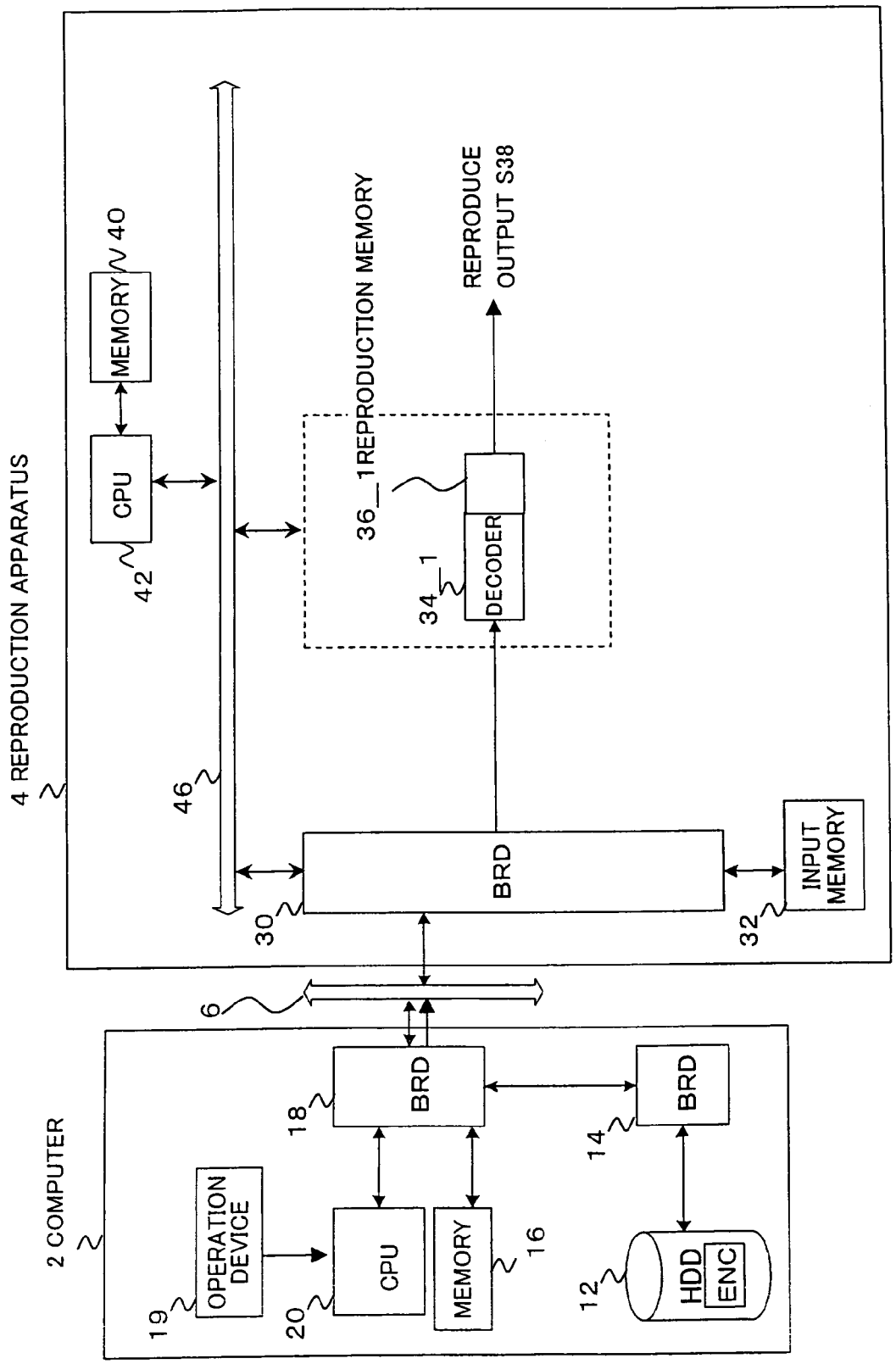
FIG. 1 is a view of the overall configuration of a data processing system according to an embodiment of the present invention.

FIG. 1 is a view of the overall configuration of a data processing system 1 according to an embodiment of the present invention. As shown in FIG. 1, the data processing system 1, for example, has a computer 2 and a reproduction apparatus 4.

[Computer 2]

As shown in FIG. 1, the computer 2 has an HDD 12, a bridge 14, a memory 16, a bridge 18, an operation device 19, and a CPU 20. Note that the memory 16 stores a predetermined program (program of the fourth aspect of the invention), while the CPU 20 reads out and executes the program to perform the following processing. The predetermined program may be stored in a semiconductor memory or other memory 16 or stored on an HDD, optical disk, or other storage medium. The HDD 12 for example stores reproduced data ENC encoded by the MPEG scheme.

Figure 2:
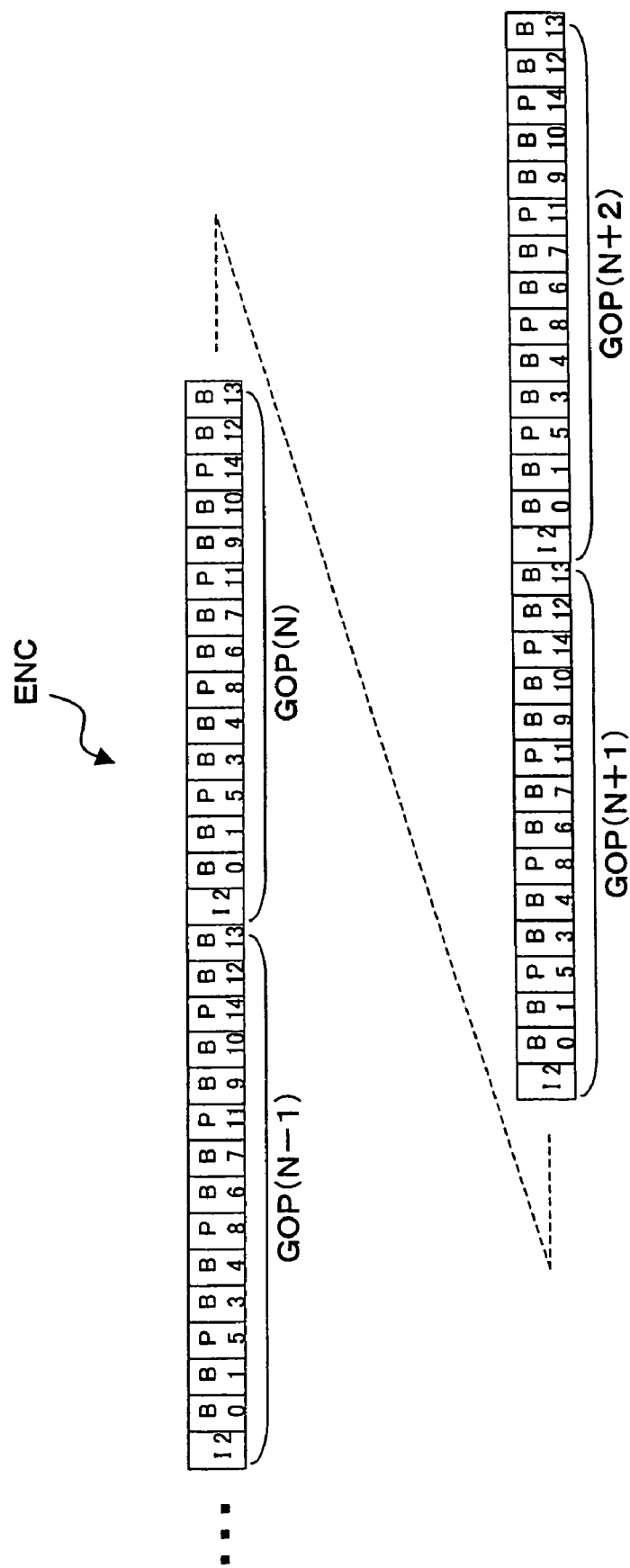
FIG. 2 is a view for explaining reproduced data ENC to be decoded by the data processing system shown in FIG. 1.

The reproduced data ENC, as shown in FIG. 2, is comprised of a plurality of GOP (Groups Of Pictures) successively decoded at the reproduction apparatus 4. In the example shown in FIG. 2, it is decoded in the order of GOP (N−1), (N), (N+1), (N+2). Each GOP is comprised of I, P, and B picture data (frame data). Further, each GOP includes a single I picture data. In the present embodiment, for example, a so-called "long GOP" with a relatively large number of picture data in the GOP is used.

The I picture data is picture data of an intra-(in-frame) encoded image and is decoded independently from other picture data. Further, the P picture data is picture data of the frame predictively encoded in the forward direction and is decoded with reference to the I or P picture data positioned time-wise in the past (previous display order). Note that the "I and P picture data" is also referred to as the "anchor picture data". Further, the B picture data is picture data of the frame predictively encoded in two directions and is decoded while referring to the I or P picture data positioned time-wise in front or in back (display order in front or back).

Note that the plurality of picture data forming the reproduced data includes first type of picture data where the decoding results of the reproduction apparatus 4 are referred to in decoding other picture data and second type of picture data where the decoding results are not referred to in decoding other picture data. This first type of picture data corresponds to the I picture data and P picture data, while the second type of picture data corresponds to the B picture data.

Note that the read rate of the HDD 12 is slower than the maximum reproduction rate of the reproduction apparatus 4. Further, the maximum data transfer rate from the computer 2 to the reproduction apparatus 4 is slower than the maximum reproduction rate of the reproduction apparatus 4.

The bridge 14 provides an expansion function of the bridge 18 and is provided with a PCI expansion slot or IDE (Integrated Drive Electronics) slot etc. The bridge 14 basically has the same functions as the bridge 18, but has a narrower bandwidth than the bridge 18 and has lower speed access devices than the devices connected to the bridge 18 connected to it.

The memory 16 is for example a semiconductor memory and stores the programs and data used for the processing by the CPU 20. The operation device 19 is a keyboard, mouse, or other operating means and outputs an operation signal corresponding to user operations to the CPU 20. The operation device 19 receives an operation for designating a reproduction point of the reproduced data ENC, an operation for issuing a reproduction start command of the designated reproduction point, and an operation for changing the reproduction rate and outputs an operation signal showing the same to the CPU 20. The bridge 18 has the bridge 14, memory 16, PCI bus 6, and CPU 20 connected to it and converts data along with transfer through the CPU 20 address bus and data bus.

The CPU 20, for example, executes a program read from the memory 16 to control the operation of the computer 2. When the CPU 20 receives an operation signal from the operation device 19 indicating the operation for designating a reproduction point, it reads the GOP including the picture data of the designated reproduction point from the HDD 12 and outputs (transfers) it through the bridge 18 and PCI bus 6 to the reproduction apparatus 4. Further, the CPU 20 successively reads GOPs from the HDD 12 in accordance with the state of progress in reproduction by the reproduction apparatus 4 and outputs the results to the reproduction apparatus 4. Further, the CPU 20 outputs the transfer completion notification TCN of the CPU 42 of the reproduction apparatus 4 linked with the output of the GOP to the reproduction apparatus 4.

The transfer completion notification TCN, as shown in FIG. 3, shows the identification data of the GOP output (transferred) from the computer 2 to the reproduction apparatus 4, the address in the input memory 32 where the GOP is written, and the size of the data of the GOP. Further, the transfer completion notification shows the identification data of each picture data in the output GOP, the address in the input memory 32 where the picture data is written, and the size of the picture data. Further, when the CPU 20 receives an operation signal indicating a reproduction start command operation from the operation device 19, it outputs a reproduction start command designating a reproduction point through the bridge 18 and PCI bus 6 to the reproduction apparatus 4.

Further, when receiving as input an operation signal indicating an operation for commanding a reproduction rate from the operation device 19, the CPU 20 outputs a reproduction rate command for setting the reproduction rate through the bridge 18 and PCI bus 6 to the reproduction apparatus 4. Further, when receiving an operation signal indicating an operation for commanding a change in the reproduction rate from the operation device 19, the CPU 20 outputs a commanding indicating a change in the reproduction rate through the bridge 18 and PCI bus 6 to the reproduction apparatus 4.

Further, the CPU 20 judges whether the reproduction rate of picture data by the reproduction apparatus 4 is slower than the transfer rate for transferring picture data to the reproduction apparatus 4. When judging as a result of that judgment that the reproduction rate is slower than the transfer rate, it outputs all of the picture data forming the reproduced data to the reproduction apparatus 4.

Further, when judging that the reproduction rate is faster than the transfer rate, the CPU 20 transfers the part of the picture data able to be transferred in accordance with the reproduction rate in all of the plurality of picture data forming the reproduced data to the reproduction apparatus 4.

Further, when judging that the reproduction rate is faster than the transfer rate, the CPU 20 outputs the I and P picture data with priority over the B picture data in accordance with the reproduction rate in all of the plurality of picture data forming the reproduced data. Further, when judging that the reproduction rate is faster than the transfer rate, the CPU 20 outputs the I picture data, P picture data, and B picture data in that priority order to the reproduction apparatus 4 in all of the plurality of picture data forming the reproduced data.

Further, the CPU 20 writes the picture data into the input memory 32 of the reproduction apparatus 4 and causes the picture data written into the input memory 32 to be decoded and reproduced at the designated reproduction rate.

When causing the picture data to be written in the input memory 32 of the reproduction apparatus 4, the CPU 20 generates management information for reference when the reproduction apparatus 4 reads and reproduces picture data from the input memory 32 and outputs the generated management information to the reproduction apparatus 4. This management information corresponds to the transfer completion notification TCN shown in FIG. 3.

Further, the CPU 20 receives a command for changing a reproduction rate faster than the transfer rate to a reproduction rate slower than the transfer rate, temporarily stops the reproduction by the reproduction apparatus 4, outputs all of the plurality of picture data forming the reproduced data corresponding to a frame being reproduced to the reproduction apparatus 4, and causes the reproduction apparatus 4 to reproduce reproduced data from the temporarily stopped reproduction point at the designated reproduction rate.

The CPU 20 receives a command for changing from a reproduction rate faster than the transfer rate to a reproduction rate slower than the transfer rate, outputs all of the plurality of picture data forming the reproduced data corresponding to the next frame of the frame being reproduced by the reproduction apparatus 4 to the reproduction apparatus 4, and causes the reproduction apparatus 4 to reproduce the reproduced data at the reproduction rate.

Further, when the CPU 20 receives as input an operation signal indicating a transient command operation from the operation device 19, it outputs that transient command through the bridge 18 and PCI bus 6 to the reproduction apparatus 4. Further, when the CPU 20 receives as input an operation signal indicating a transient command operation, it judges if a GOP including the picture data to be used next in reproduction in the reproduction direction after the transient is stored in the input memory 32 and outputs the GOP to the reproduction apparatus 4 conditional on it being judged that it is not stored. On the other hand, when the CPU 20 judges that the GOP is stored in the input memory 32, it does not output the GOP to the reproduction apparatus 4, but outputs the transfer completion notification of the GOP to the CPU 42 of the reproduction apparatus 4. The CPU 20 manages the GOPs and picture data stored in the input memory 32 of the reproduction apparatus 4 based on the transfer completion notification, transient command, reproduction speed command, etc. output to the reproduction apparatus 4. Due to this, the CPU 20 can judge if the GOP including the picture data to be used next for reproduction in the reproduction direction after the transient is stored in the input memory 32 or not. Further, the CPU 20 determines the address of the GOP to be written next so that as to enable part of the picture data in the picture data already reproduced in the reproduction apparatus 4 in the picture data stored in the picture data input memory 32 to be overwritten.

Further, the CPU 20 may also make the judgment comparing the transfer rate and reproduction rate based on the maximum transfer rate. For example, the CPU 20 may judge if the reproduction rate of the picture data by the reproduction apparatus 4 is slower than the maximum transfer rate for transferring picture data to the reproduction apparatus 4. If it judges as a result of the judgment that the reproduction rate is slower than the transfer rate, it may output all of the picture data forming the reproduced data to the reproduction apparatus 4.

[Reproduction Apparatus 4]

As shown in FIG. 1, the reproduction apparatus 4, for example, has a PCI bridge 30, an input memory 32, a decoder 34_1, a reproduction memory 36_1, a selector 38, a control memory 40, a CPU 42, and a control bus 46. Note that the control memory 40 stores a predetermined program and that the CPU 42 reads and executes that program to perform the following processing. The predetermined program may be stored in a semiconductor memory or other control memory 40 or may be stored on an HDD, optical disk, or other storage medium.

The PCI bridge 30 is provided with a memory for buffering the GOPs and commands input via the PCI bus 6 from the computer 2. Further, the bridge 18 is provided with a dynamic memory access (DMA) transfer function. The input memory 32 is an SDRAM or other semiconductor memory and temporarily stores GOPs input via the PCI bridge 30.

The decoder 34_1, under the control of the CPU 42, decodes the picture data read out via the PCI bridge 30 from the input memory 32 by the MPEG scheme and writes the results into the reproduction memory 36_1. Specifically, the decoder 34_1, under the control of the CPU 42, decodes the I picture data read from the input memory 32 without referring to the decoding results of other picture data. Further, the decoder 34_1, under the control of the CPU 42, decodes the P picture data read from the input memory 32 by referring to the decoding results of the I or P picture data positioned time-wise in the past and already having decoding results stored in the reproduction memory 36_1. Further, the decoder 34_1, under the control of the CPU 42, decodes the B picture data read from the input memory 32 by referring to the decoding results of the I or P picture data positioned time-wise before and after it and already having decoding results stored in the respective reproduction memory 36_1.

Further, under the control of the CPU 42, it reproduces and outputs the decoded picture data read from the reproduction memory 36_1 as the picture data S38.

The CPU 42 writes the GOP input from the computer 2 (reproduced data ENC) to the input memory 32. Further, the CPU 42 performs scheduling for determining the order of decoding the picture data in said GOP in units of GOPs in the reproduced data ENC stored in the input memory 32. The CPU 42 causes the decoder 34_1 to perform the decoding based on the results of the scheduling.

The CPU 42, for example, reads the I and P picture data in the GOP(N−1) and the B picture data in the GOP(N) decoded referring to the decoding results of the I and P picture data through the PCI bridge 30 from the input memory 32 and outputs it to the decoder 34_1.

Here, in the present embodiment, an open GOP decoded with reference to the decoding results of the I, P picture data of a GOP with different B picture data is referred to.

When for example receiving as input a reproduction start command from the CPU 20 of the computer 2, the CPU 42 makes the decoding of the plurality of GOPs including the reproduction point be performed at the decoder 34_1.

When for example receiving as input a reproduction start command from the CPU 20 of the computer 2, the CPU 42 makes the decoding of the plurality of GOPs including the reproduction point be performed at the decoders 34_1, 34_2, and 34_3. At this time, the CPU 42 controls the decoding of the B picture data by the decoder 34_1 and the read operation from the reproduction memory 36_1 so that reproduction and output are performed at a designated reproduction rate from the reproduction point.

Further, the CPU 42 manages the addresses of the GOPs and picture data stored in the input memory 32 based on the transfer completion notifications input from the CPU 20.

Below, examples of operation of the data processing system 1 shown in FIG. 1 will be explained.

<First Example of Operation>

Figure 4:
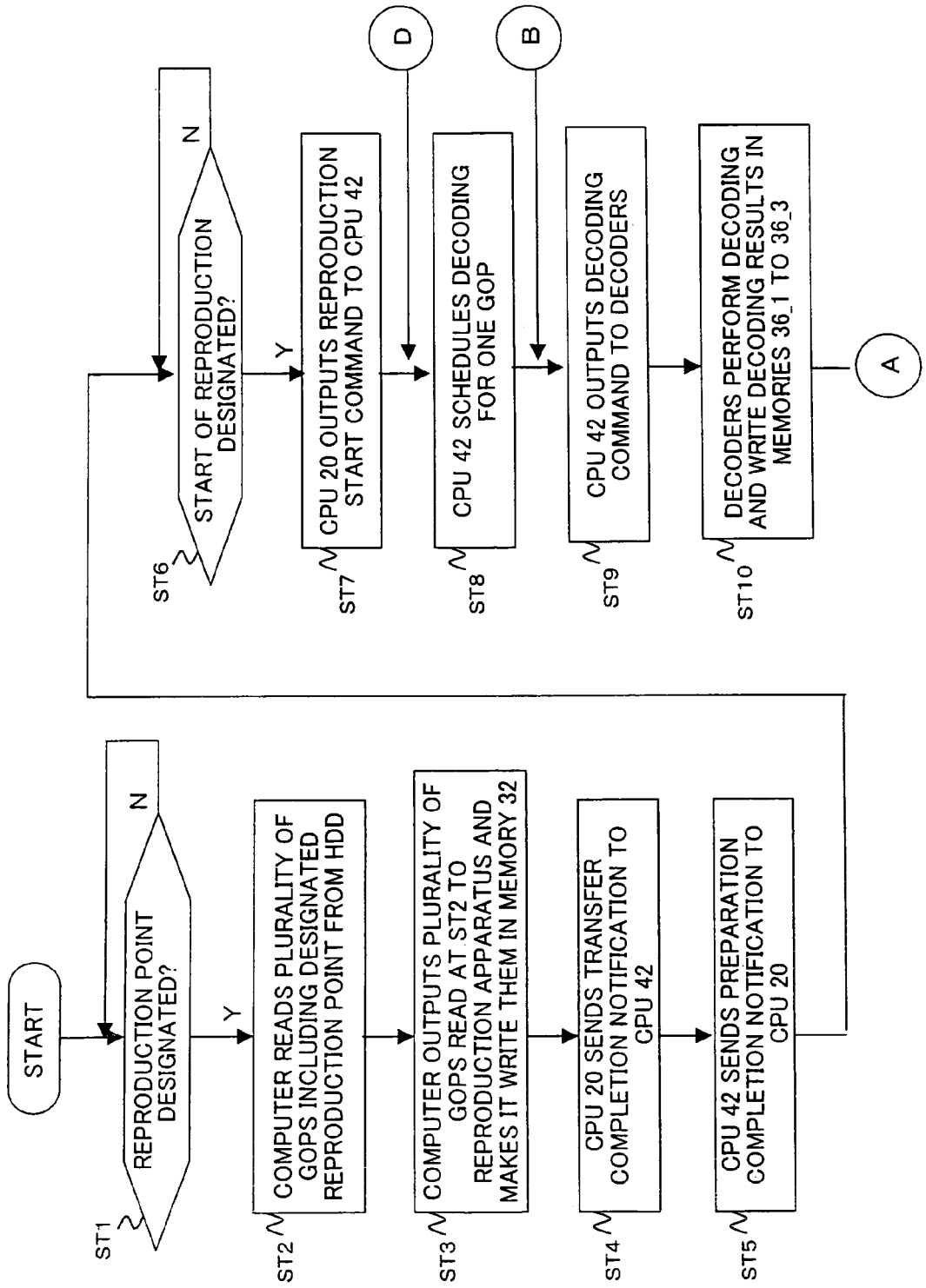
FIG. 4 is a flow chart for explaining an example of the overall operation of the data processing system shown in FIG. 1.
Figure 5:
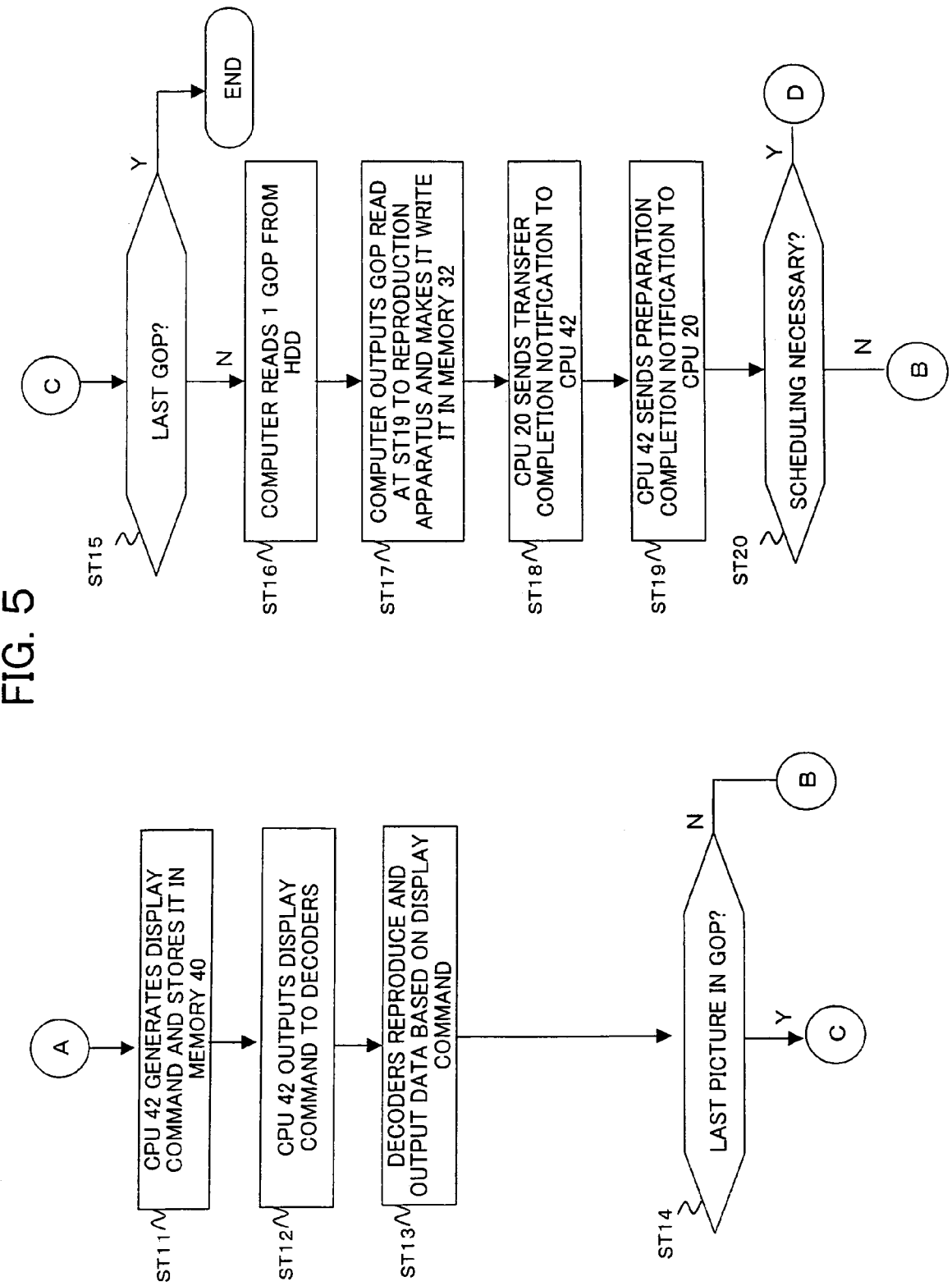
FIG. 5 is a flow chart following FIG. 4 for explaining an example of the overall operation of the data processing system shown in FIG. 1.

Below, an example of the overall operation of the data processing system 1 will be explained. FIG. 4 and FIG. 5 are flow charts for explaining an example of the overall operation of the data processing system 1 shown in FIG. 1.

Step ST1:

The CPU 20 of the computer 2 judges if an operation signal indicating an operation for designation of a reproduction point in the reproduced data ENC has been input from the operation device 19. It proceeds to step ST2 when judging it has been designated, while repeats the processing of step ST1 when judging it has not.

Step ST2:

The CPU 20 of the computer 2 reads from the HDD 12 the GOP including the picture data of the reproduction point designated at step ST1 and the surrounding GOPs or a total of three (plurality of) GOPs.

Step ST3:

The CPU 20 of the computer 2 outputs the plurality of GOPs read at step ST2 through the bridge 18 and PCI bus 6 to the reproduction apparatus 4. The CPU 42 of the reproduction apparatus 4 writes the GOPs input from the computer 2 through the PCI bridge 30 into the input memory 32.

Step ST4:

The CPU 20 of the computer 2 outputs a transfer completion notification to the CPU 42 of the reproduction apparatus 4. This transfer completion notification shows the identification data of the GOPs output (transferred) at step ST3 from the computer 2 to the reproduction apparatus 4, the addresses in the input memory 32 where the GOPs are written, and the sizes of the data of the GOPs. The CPU 42 writes the transfer completion notification into the control memory 40. In the present embodiment, the CPU 20 and CPU 42 hold the transfer completion notification and, based on transfer completion notification, manage the GOPs stored in the input memory 32.

Step ST5:

The CPU 42 of the reproduction apparatus 4, after finishing the processing of step ST4, outputs a preparation completion notification to the CPU 20 of the computer 2.

Step ST6:

The CPU 20 of the computer 2 judges if an operation signal indicating a reproduction start command operation designating a reproduction point has been input from the operation device 19. It proceeds to step ST7 when judging it has been input, while repeats the processing of step ST6 when judging it has not.

Step ST7:

When judging input, the CPU 20 of the computer 2 outputs a reproduction start command designating a reproduction point to the CPU 42 of the reproduction apparatus 4.

Step ST8:

The CPU 42 of the reproduction apparatus 4 performs scheduling for determining the order of decoding the picture data in a GOP stored in the input memory 32 including picture data of a reproduction point indicated by the reproduction start command input at step ST7 in accordance with the relationship of inter-reference between the picture data, the reproduction rate, the reproduction direction, etc.

Step ST9:

The CPU 42 of the reproduction apparatus 4 outputs a decode command indicating the picture data to be decoded next based on the results of scheduling of step ST8 to the decoder 34_1.

Step ST10:

The decoder 34_1 reads and decodes the picture data indicated by the decode command input at step ST9 and writes the decoding results in the respective reproduction memory 36_1.

Step ST11:

The CPU 42 of the reproduction apparatus 4 specifies the decoding results to be next reproduced and output based on the designated reproduction direction or reproduction rate and the scheduling results, generates a display command showing the decoding results, and writes it in the control memory 40.

Step ST12:

The CPU 42 of the reproduction apparatus 4 outputs the display command generated at step ST11 to the decoder 34_1.

Step ST13:

The decoder 34_1 reads out the decoding results indicated by the display command input at step ST12 from the reproduction memory 36_1 and reproduces and outputs it.

Step ST14:

The CPU 20 and CPU 42 judge if the picture data processed at step ST9 to ST13 is the last picture data in the GOP. If judging that it is the last picture data, they proceed to step ST15, while when judging it is not, they return to step ST9 and perform the processing of the next picture data.

Step ST15:

The CPU 20 and CPU 42 judge if the GOP to which the processed picture data belongs is the last GOP in the reproduced data ENC. When judging that it is the last GOP, they end the processing, while when not, they proceed to step ST16.

Step ST16:

The CPU 20 of the computer 2 reads the next GOP from the HDD 12 in accordance with the reproduction direction or reproduction rate.

Step ST17:

The CPU 20 of the computer 2 outputs the GOP read at step ST19 through the bridge 18 and PCI bus 6 to the reproduction apparatus 4. The CPU 42 of the reproduction apparatus 4 writes the GOP input from the computer 2 through the PCI bridge 30 to the input memory 32.

Step ST18:

The CPU 20 of the computer 2 outputs a transfer completion notification of the GOP output at step ST20 to the CPU 42 of the reproduction apparatus 4. The CPU 42 writes the transfer completion notification in the control memory 40.

Step ST19:

The CPU 42 of the reproduction apparatus 4, after ending the processing at step ST21, outputs a preparation completion notification to the CPU 20 of the computer 2.

Step ST20:

The CPU 42 of the reproduction apparatus 4, for example, judges if the scheduling of the GOP including the picture data of a reproduction point next in accordance with the reproduction direction has been completed or not (that is, if scheduling is required). When judging that scheduling has not been completed, it proceeds to step ST8, while when judging it has, it proceeds to step ST9.

<Second Example of Operation>

Figure 6:
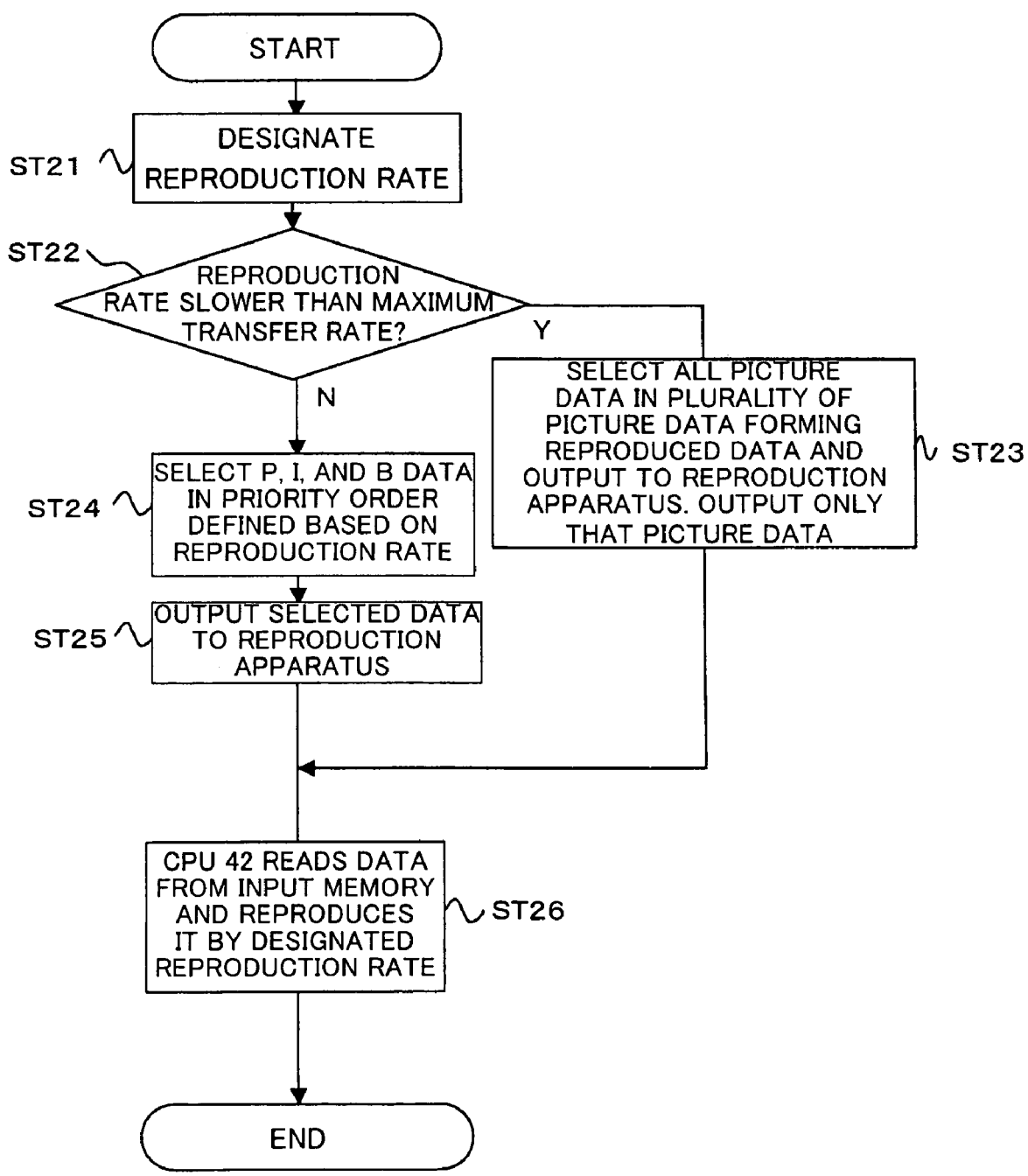
FIG. 6 is a flow chart for explaining the operation when designating the reproduction rate of the data processing system shown in FIG. 1.

Below, the operation when designating the reproduction rate will be explained. FIG. 6 is a flow chart for explaining the operation when designating the reproduction rate of the data processing system shown in FIG. 1.

Step ST21:

The operation device 19 of the computer 2 inputs an operation signal indicating a designation operation for designating the reproduction rate to the CPU 20

Step ST22:

The CPU 20 of the computer 2 judges if the reproduction rate input from the operation device 19 is slower than the transfer rate for transferring picture data to the reproduction apparatus 4, for example, the maximum transfer rate. If judging it is slower, it proceeds to step ST23, while if not, it proceeds to the processing of step ST24. For example, in the present embodiment, the maximum transfer rate is a data transfer rate corresponding to a 5× speed reproduction rate.

Step ST23:

When the CPU 20 of the computer 2 judges as a result of the judgment at step ST22 that the reproduction rate is slower than that transfer rate, it outputs all of the picture data forming the reproduced data, specifically the I, P, and B picture data, through the bridge 18 and PCI bus 6 to the reproduction apparatus 4 and proceeds to step ST26.

Step ST24:

When the CPU 20 of the computer 2 judges at the judgment at step ST22 that the reproduction rate is faster than the transfer rate, it selects the part of the picture data able to be transferred by that transfer rate in accordance with the reproduction rate in all of the plurality of picture data forming the reproduced data.

FIG. 7 is a view for explaining the priority order of data when the computer 2 of the data processing system 1 shown in FIG. 1 transfers data to the reproduction apparatus 4. FIG. 7A is a view for explaining a specific example of the priorities of the I, P, and B picture data. FIG. 7B is a view for explaining a specific example of the mode of output corresponding to the priorities of the I, P, and B picture data.

Specifically, the CPU 20 of the computer 2, for example as shown in FIG. 7A, selects the I, P, and B picture data in accordance with the reproduction rate in that priority order from all of the plurality of picture data forming the reproduced data. The CPU 20 specifically, as shown in for example FIG. 7B, outputs the I, P, and B picture data to the CPU 20 when judging that the reproduction rate is slower than the maximum transfer rate. When judging that the reproduction rate is faster than the maximum transfer rate, the CPU 20 selects the picture data in accordance with the faster reproduction rate, for example, as shown in FIG. 7B, the I and P picture data and part of the B picture data, the I and P picture data, part of the I picture data and P picture data, the I picture data, and part of the I picture data.

Step ST25:

The CPU 20 of the computer 2 outputs the data selected at step ST24 through the bridge 18 and PCI bus 6 to the reproduction apparatus 4. The CPU 42 of the reproduction apparatus 4 writes the data input from the computer 2 through the PCI bridge 30 to the input memory 32. The CPU 20 of the computer 2 outputs a transfer completion notification TCN to the CPU 42 of the reproduction apparatus 4. The CPU 42 writes the transfer completion notification TCN in the control memory 40. The CPU 42 of the reproduction apparatus 4 outputs a preparation completion notification to the CPU 20 of the computer 2.

Step ST26:

The CPU 42 of the reproduction apparatus 4 for example performs scheduling of GOPs including picture data of the next reproduction point in accordance with the reproduction rate or reproduction direction and, based on the results of the scheduling, outputs a decode command indicating the picture data to the decoder 34_1. The decoder 34_1 reads out and decodes picture data indicated by the decode command from the input memory 32 and writes the decoding results into the reproduction memory 36_1. The CPU 42 of the reproduction apparatus 4 identifies the decoding results to be reproduced and output next based on the designated reproduction rate and scheduling results and writes a display command indicting the decoding results into the control memory 40. The CPU 42 of the reproduction apparatus 4 outputs the display command to the decoder 34_1, and the decoder 34_1 reads the decoding results indicated by the display command from the reproduction memory 36_1 for reproduction and output.

Figure 8:
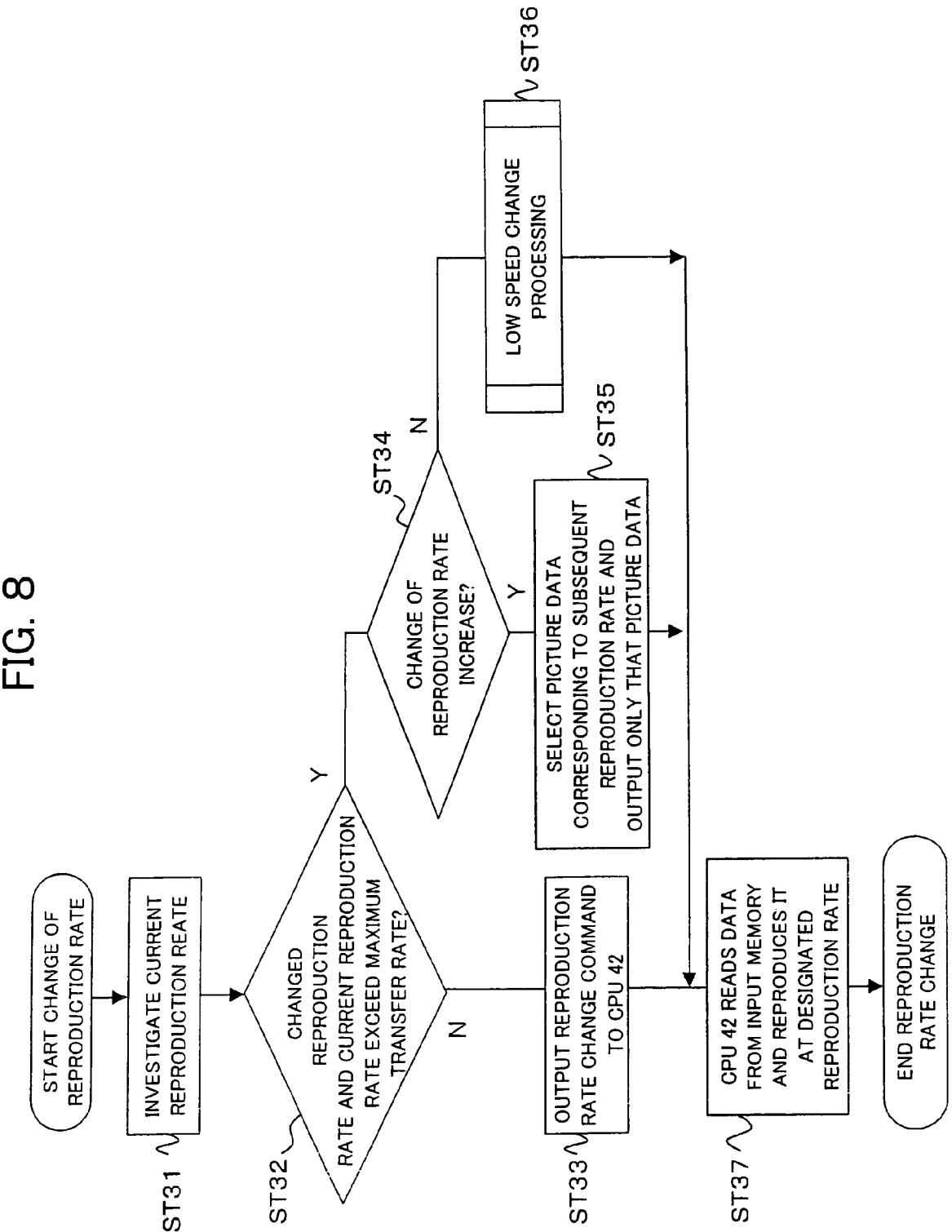
FIG. 8 is a flow chart for explaining a specific example of the operation when changing a reproduction rate of the data processing system shown in FIG. 1.

Below a specific example of the operation at the time of change of the reproduction rate of the data processing system 1 will be explained. FIG. 8 is a flow chart for explaining a specific example of the operation at the time of changing the reproduction rate of the data processing system shown in FIG. 1.

Step ST31:

When receiving as input from the operation device 19 an operation signal indicating a command operation for changing the reproduction rate, the CPU 20 of the computer 2 investigates the current reproduction rate by the reproduction apparatus 4 and obtains data indicating the current reproduction rate.

Step ST32:

The CPU 20 of the computer 2 judges whether to skip in the maximum transfer rate by the changed reproduction rate and the current reproduction rate obtained at step ST31. Specifically, when for example the maximum transfer rate is a data transfer rate corresponding to 5× speed reproduction, the CPU 20 judges whether to change the maximum transfer rate by skipping from 1× speed reproduction to 6× speed reproduction or 6× speed reproduction to 1× speed reproduction. If judging not to change the maximum transfer rate by skipping, it proceeds to step ST33, while if judging to change by skipping, it proceeds to step ST34.

Step ST33:

The CPU 20 of the computer 2 outputs a reproduction rate change command through the bridge 18 and PCI bus 6 to the CPU 42 of the reproduction apparatus 4 and proceeds to step ST37.

Step ST34:

The CPU 20 of the computer 2 judges whether the change from the current reproduction rate to the changed reproduction rate is an increase. When as a result of judgment, it judges that it is an increase, it proceeds to the processing of step ST35, while when it judges that it is not an increase, it proceeds to the processing of step ST36.

Step ST35:

When the reproduction rate is slower than the maximum transfer rate, the CPU 20 of the computer 2 outputs only the data required for reproduction to the reproduction apparatus 4 and then proceeds to step ST37. For example, when the maximum transfer rate is a transfer rate corresponding to 5× speed reproduction, the CPU 20 of the computer 2 selects the I and P picture data etc. in accordance with the reproduction rate in the change to for example 6× speed reproduction or 15× speed reproduction or so, outputs the I and P picture data through the bridge 18 and PCI bus 6 to the reproduction apparatus 4, and writes this in the input memory 32 of the reproduction apparatus 4.

Figure 9:
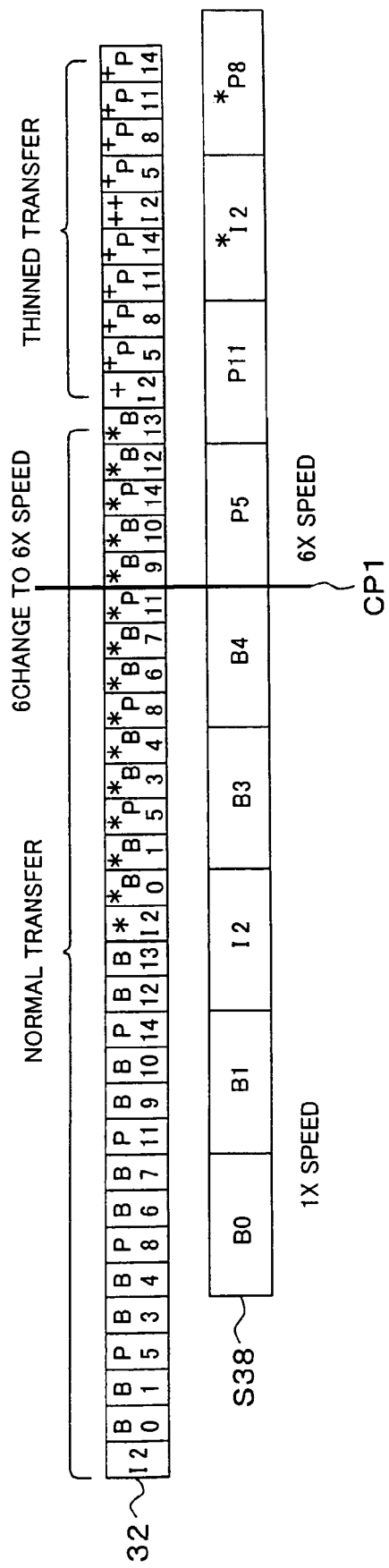
FIG. 9 is a view for explaining a specific example of the operation of a data processing system when changing from a reproduction rate lower than a maximum transfer rate to a reproduction rate higher than it at step ST35 shown in FIG. 8.

FIG. 9 is a view for explaining a specific example of the operation of the data processing system when changing from a reproduction rate lower than the maximum transfer rate to a higher reproduction rate at step ST35 shown in FIG. 8.

As shown in FIG. 9, for example, at the time of 1× speed reproduction, I, P, and B picture data are written into the input memory 32 from the computer 2 to the reproduction apparatus 4, data read from the input memory 32 is decoded by the decoder 34_1 under the control of the CPU 42 in accordance with the decoding scheduling, and a reproduction output signal S38 is output in accordance with the reproduction schedule. In FIG. 9, the picture data with asterisks attached, the picture data with plus marks attached, the picture data with double plus marks attached, and the picture data with nothing attached indicate picture data included in different GOPs. At the change point CP1, for example, if receiving a command signal for changing from 1× speed reproduction to 6× speed reproduction, the data required for 6× speed reproduction is transferred after thinning and a reproduction output signal S38 is output in accordance with the reproduction schedule.

Step ST36:

When the CPU 20 of the computer 2 judges at the judgment at step ST34 that the change from the current reproduction rate to the changed reproduction rate is not an increase, that is, when the CPU 20 judges that the change from the current reproduction rate to the changed reproduction rate is a decrease, it performs the later explained low speed change processing, outputs the data required for reproduction to the reproduction apparatus 4, and proceeds to the processing of step ST37.

Step ST37:

When the CPU 42 of the reproduction apparatus 4 receives as input a signal indicating a command for starting reproduction at a designated reproduction rate from the CPU 20 of the computer 2, as explained above, it reads the picture data from the input memory 32, has the decoder 34_1 decode it, writes the decoding results in the reproduction memory 36_1, and reads this and reproduces and outputs it from the reproduction memory 36_1 at the designated reproduction rate.

As explained above, in the data processing system 1, when the CPU 20 of the computer 2 judges if the reproduction rate of the picture data by the reproduction apparatus 4 is slower than the maximum transfer rate for transferring picture data to the reproduction apparatus 4 and judges as a result of the judgment that the maximum reproduction rate is slower than the transfer rate, it outputs all of the picture data forming the reproduced data to the reproduction apparatus 4 and writes it in the input memory 32 of the reproduction apparatus 4. The CPU 42 of the reproduction apparatus 4 writes the picture data input from the computer 2 into the input memory 32, has the picture data read from the input memory 32 decoded by the decoder 34_1, and reproduces it at the reproduction rate designated by the CPU 20 of the computer 2, so when the maximum reproduction rate is slower than the transfer rate, it is possible to improve the response in slow motion reproduction.

That is, when the maximum reproduction rate is slower than the transfer rate, by transferring from the computer 2 to the reproduction apparatus 4 the GOPs including all of the I, P, and B picture data forming the reproduced data to the reproduction apparatus 4, even if the CPU 42 of the reproduction apparatus 4 changes from for example 5× speed reproduction (rate) corresponding to the maximum transfer rate to 1× speed reproduction, since the data required for 1× speed reproduction is stored in the input memory 32, it is possible to read the data from the input memory 32 and perform 1× speed reproduction is a short time.

Further, when the CPU 20 of the computer 2 judges that the reproduction rate is faster than the maximum transfer rate, since it outputs to the transmission apparatus 4 the part of the picture data able to be transferred by the maximum transfer rate in accordance with the reproduction rate in all of the plurality of picture data forming the reproduced data, even if the reproduction rate is slower than the maximum transfer rate, it is possible to reproduce a picture with a good quality in accordance with the reproduction rate.

Further, at that time, since the CPU 20 outputs the I picture data, P picture data, and B picture data in that priority order to the reproduction apparatus 4, it is possible to reproduce a picture with a high quality in accordance with the reproduction rate.

Further, since the CPU 20 writes the picture data into the input memory 32 of the reproduction apparatus 4 and decodes and reproduces the picture data written in the input memory 32 by the designated reproduction rate, the CPU 20 need only perform simple processing for issuing a command designating the reproduction rate in order for the reproduction apparatus 4 to reproduce data at the designated reproduction rate, so the processing load of the CPU 20 is small.

Specifically, since the CPU 20 generates management information (transfer completion notification TCN) for reference when the reproduction apparatus 4 reads and reproduces picture data from the input memory 32 and outputs that generated management information to the reproduction apparatus 4, the processing load of the CPU 20 is small.

Further, by providing between the storage device and decoder a device enabling high speed transfer with the decoder, holding in that device several GOPs worth of compressed picture data, and decoding the picture data read from that device in accordance with need, stable reproduction is possible even with a device unstable for a short time such as an HDD connected by for example an IDE.

Further, when reproducing compressed picture data comprised of I picture data, P picture data, B picture data, etc. by prediction between frames in both directions by the MPEG or other compression scheme, for example, long GOP type compressed picture data, by selecting the data transferred in accordance with the reproduction rate and the transfer rate of the storage device and outputting the selected data, it is possible to reduce the load in transfer processing of the HDD or other storage device.

That is, in the present invention, the processing for display of the compressed picture data can be performed from any reproduction point variable in speed seamlessly from 0× speed reproduction to the reproduction rate corresponding to the maximum transfer rate, for example 5× speed reproduction, so long as the compressed picture data to be reproduced is in the input memory 32.

Further, it is possible to use the I picture data and P picture data for reproduction for 5× speed reproduction to 15× speed reproduction. Further, since the reproduction rate is changed by for example the CPU 20 sending to the CPU 42 a command for changing the reproduction rate and the CPU 42 changes the reproduction rate upon receiving that command, the processing load on the CPU 20 is small.

Further, by transferring a plurality of GOPs of data to the input memory 32 in the initial state, even in the case where transfer from the HDD 12 is somewhat unstable, it is possible to read and stably decode and reproduce the data stored in the input memory 32.

Further, this plurality of GOPs of data is delayed by exactly the time for transfer to the input memory, but for example by transferring this plurality of GOPs of data to the input memory before setting the compressed picture data in the reproduction apparatus 4 and pushing the reproduction button, the response to the operation command is improved.

[First Specific Example of Processing to Change to Low Speed]

At step ST36 shown in FIG. 8, the CPU 20 performs processing for changing to a lower speed when changing from a reproduction rate faster than the maximum transfer rate to a slower reproduction rate. In the first specific example, when for example changing the reproduction rate, the CPU 20 retransmit GOPs having the data required for reproduction of the GOP being reproduced. For example, the maximum transfer rate from the computer 2 to the reproduction apparatus 4 corresponds to 5× speed reproduction. When changing from 6× speed reproduction to 4× speed reproduction, the CPU 20 for example changes the transfer of the thinned picture data I, P, P, P, P required for 6× speed reproduction to for example transfer of unthinned picture data I, B, P, B, B, P, B, B, P, B, B at the time of 4× speed reproduction.

However, for stable reproduction, the input memory 32 holds a plurality of GOPs worth of I, P, P, P, P, P, P picture data. The data stored in the input memory 32 can only be displayed on the screen in accordance with the I, P, P, P, P, P, P picture data.

Therefore, the CPU 20 receives a command for changing from a reproduction rate faster than the maximum transfer rate to a reproduction rate slower than the maximum transfer rate, temporarily stops the reproduction by the reproduction apparatus 4, outputs all of the plurality of picture data forming reproduced data corresponding to a frame during the reproduction to the reproduction apparatus 4, and makes the reproduction apparatus 4 reproduce data according to the reproduced data from the temporarily stopped reproduction point by the designated reproduction rate.

Figure 10:
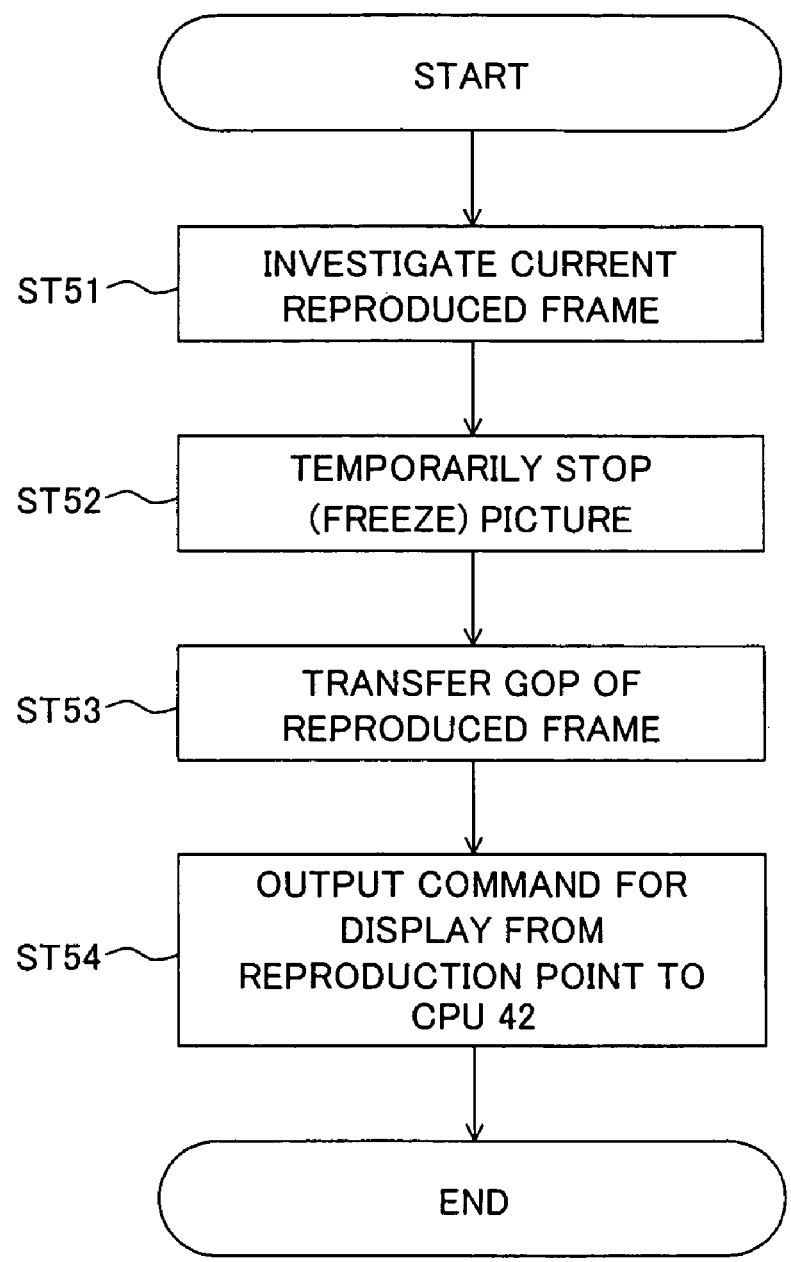
FIG. 10 is a view for explaining a specific example of the operation of a data processing system when changing from a reproduction rate higher than a maximum transfer rate to a reproduction rate lower than it at step ST36 shown in FIG. 8.
Figure 11:
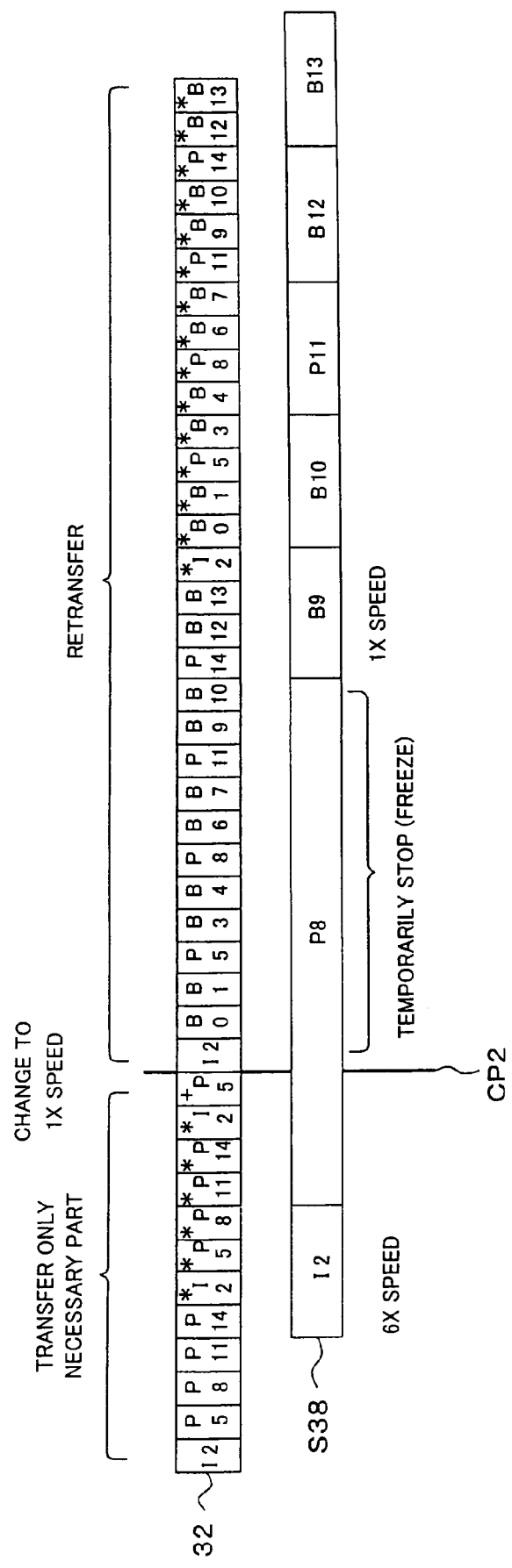
FIG. 11 is a view for explaining a first specific example of low speed change processing shown in FIG. 10.

Below, this will be explained in further detail with reference to FIG. 10 and FIG. 11. FIG. 10 is a flow chart of a first specific example of processing for changing from a reproduction rate faster than the maximum transfer rate to a slower reproduction rate at step ST34 shown in FIG. 8. FIG. 11 is a view for explaining a first specific example of processing to change to a low speed shown in FIG. 10.

For example, as shown in FIG. 11, the data required for 6× speed reproduction is input to the input memory 32, and a reproduction output signal S38 is output under control of the CPU 42 in accordance with the reproduction schedule. In FIG. 11, the picture data with asterisks attached, the picture data with plus marks attached, and the picture data with nothing attached show picture data included in separate GOPs.

Below, the steps of the flow chart of FIG. 10 will be explained.

Step ST51:

The CPU 20 of the computer 2 investigates the current reproduced frame to obtain data relating to the current reproduced frame.

Step ST52:

When the CPU 20 of the computer 2 receives as input at for example the change point CP2 a command for changing from a reproduction rate faster than the maximum transfer rate to a reproduction rate slower than the maximum transfer rate, it outputs a command for temporarily stopping reproduction by the reproduction apparatus 4 to the reproduction apparatus 4. The CPU 42 of the reproduction apparatus 4 receives that command and, as shown in FIG. 11, temporarily stops (freezes) the reproduction. At that time, the frame at the change point CP2 is displayed as a still picture.

Step ST53:

The CPU 20 of the computer 2 outputs to the reproduction apparatus 4 all of the plurality of picture data forming the reproduced data (GOP) corresponding to the frame being reproduced. The input memory 32 of the reproduction apparatus 4, as shown in FIG. 11, is written with data input from the computer 2.

Step ST54:

The CPU 20 of the computer 2 outputs a command for causing reproduction of reproduced data from the reproduction point temporarily stopped at the reproduction apparatus 4 in accordance with a designated reproduction rate through the bridge 18 and PCI bus 6 to the reproduction apparatus 4.

In the first specific example, as explained above, since the GOP including a frame being reproduced at the change point CP2 is transferred again until that frame is reproduced, time is taken for reproducing the next frame after the reproduced frame and the display screen is temporarily stopped during that time, but if the transfer finishes, it is possible to reproduce data reliably at the changed reproduction rate from the change point CP2.

[Second Specific Example of Processing to Change to Lower Speed]

In the second specific example of processing for changing to a lower speed at step ST36 of FIG. 8, for example, when the reproduction rate is changed, the CPU 20 outputs the data required for reproduction of the next GOP after the GOP being reproduced to the reproduction apparatus 4.

Figure 12:
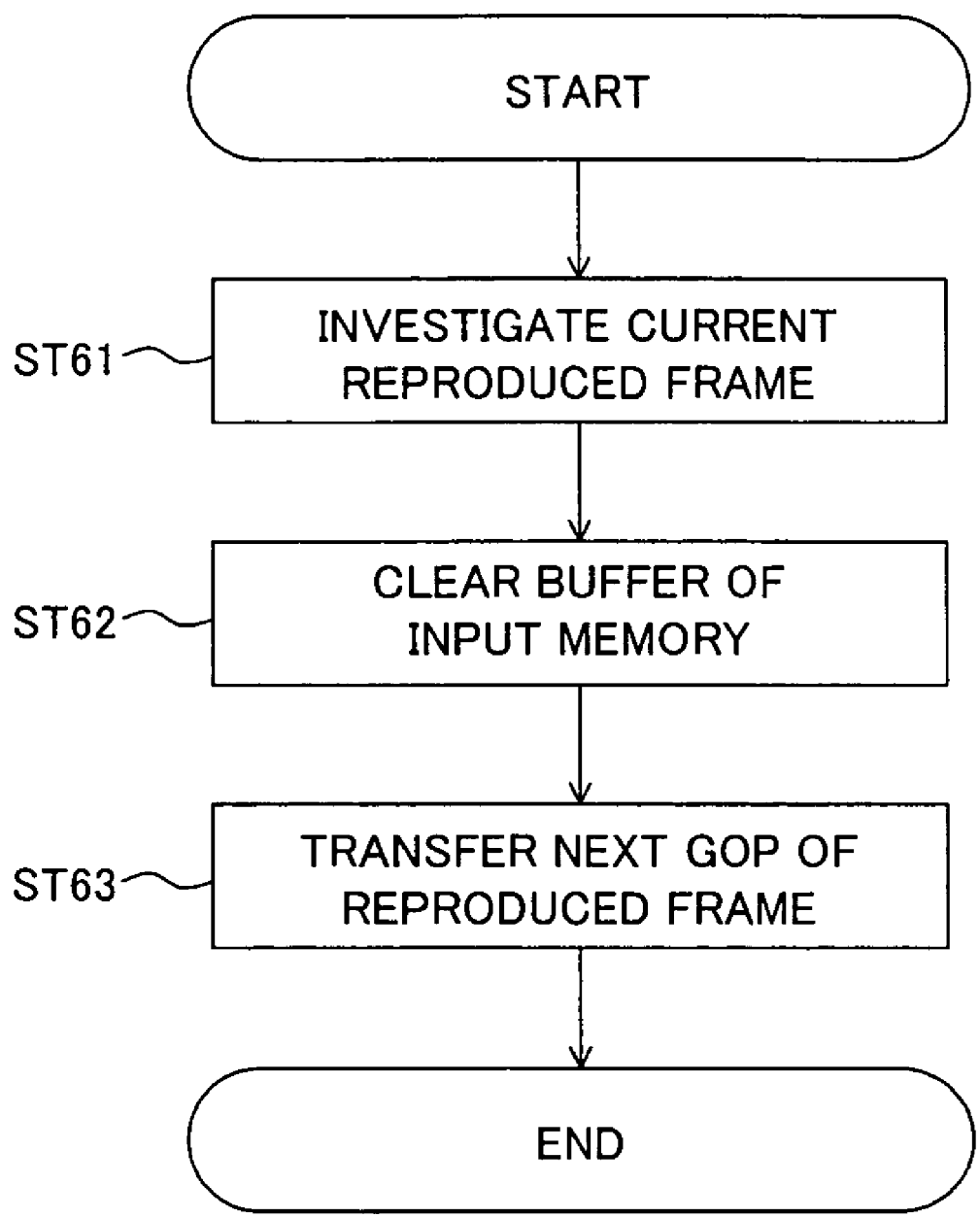
FIG. 12 is a view for explaining a second specific example of low speed change processing when changing from a reproduction rate higher than a maximum transfer rate to a reproduction rate lower than it at step ST36 shown in FIG. 8.
Figure 13:
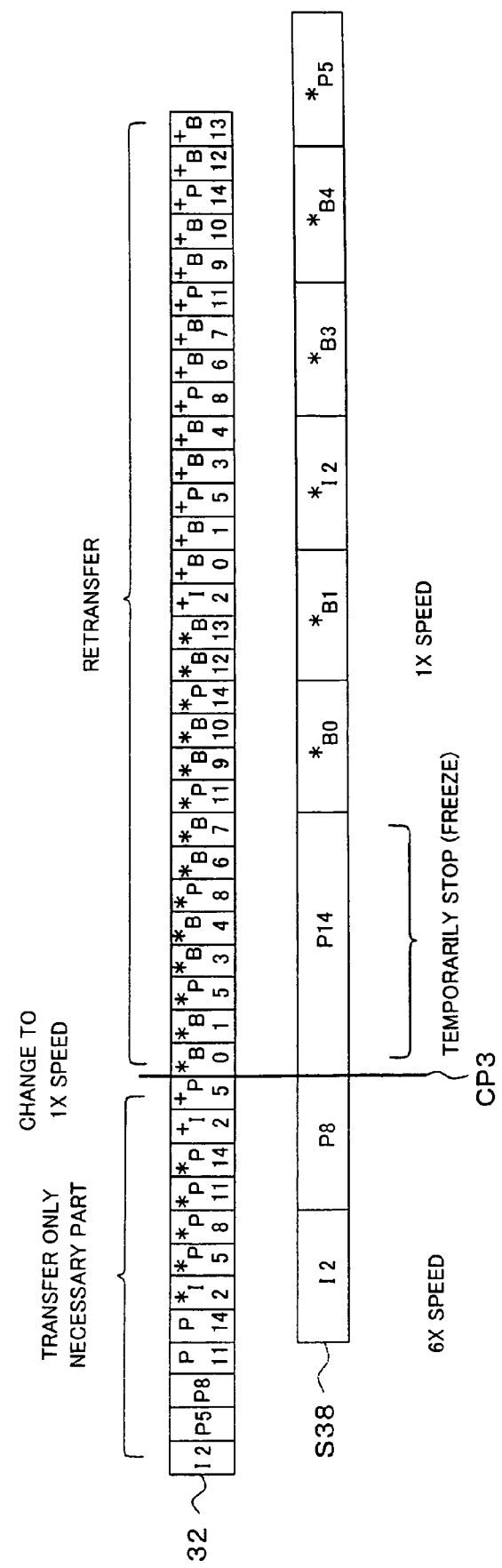
FIG. 13 is a view for explaining a second detailed example of the low speed change processing shown in FIG. 11.

FIG. 12 is a flow chart for explaining a second specific example of processing for changing from a reproduction rate faster than the maximum transfer rate to a slower reproduction rate at step ST36 of FIG. 8. FIG. 13 is a view for explaining the second specific example of the low speed change processing shown in FIG. 11. In FIG. 13, picture data with asterisks attached, picture data with plus marks attached, and picture data with nothing attached indicate picture data included in separate GOPs.

Below, the steps of the flow chart of FIG. 12 will be explained.

For example, as shown in FIG. 13, the data required for 6× speed reproduction is input to the input memory 32.

Step ST61:

The CPU 20 of the computer 2 investigates the current reproduced frame to obtain data on the current reproduced frame.

Step ST62:

If receiving at the change point CP3 a command from the operation device 19 to change from a reproduction rate faster than the maximum transfer rate to a reproduction rate slower than the maximum transfer rate, the CPU 20 of the computer 2 outputs a command to clear the buffer of the input memory 32 to the reproduction apparatus 4. The data in the input memory 32 of the reproduction apparatus 4 is then cleared in accordance with that command.

Step ST63:

The CPU 20 of the computer 2 outputs to the reproduction apparatus 4 all of the plurality of picture data forming the reproduced data (GOP) corresponding to the next frame after the frame being reproduced at the change point CP3. Further, the reproduction apparatus 4 is made to reproduce the reproduced data at the designated reproduction rate.

In the second specific example, as explained above, when changing the reproduction rate at the change point CP3, the CPU 20 outputs to the reproduction apparatus 4 the data required for reproduction from the next GOP after the GOP being reproduced, so the GOP currently being reproduced is displayed as is at 6× speed, the response to the change in reproduction rate ends up becoming slow, and, if the next GOP does not finish being transferred during reproduction of the GOP currently being reproduced, the display screen ends up temporarily stopping, but if it finishes being transferred, reproduction is possible reliably from the next GOP at the change point CP3 by the designated reproduction rate.

[Third Specific Example of Processing to Change to Lower Speed]

In the third specific example of processing to change to a low speed at step ST36 of FIG. 8, when for example the reproduction rate is changed, the CPU 20 outputs only the insufficient data from the reproduced location to the reproduction apparatus 4.

Figure 14:
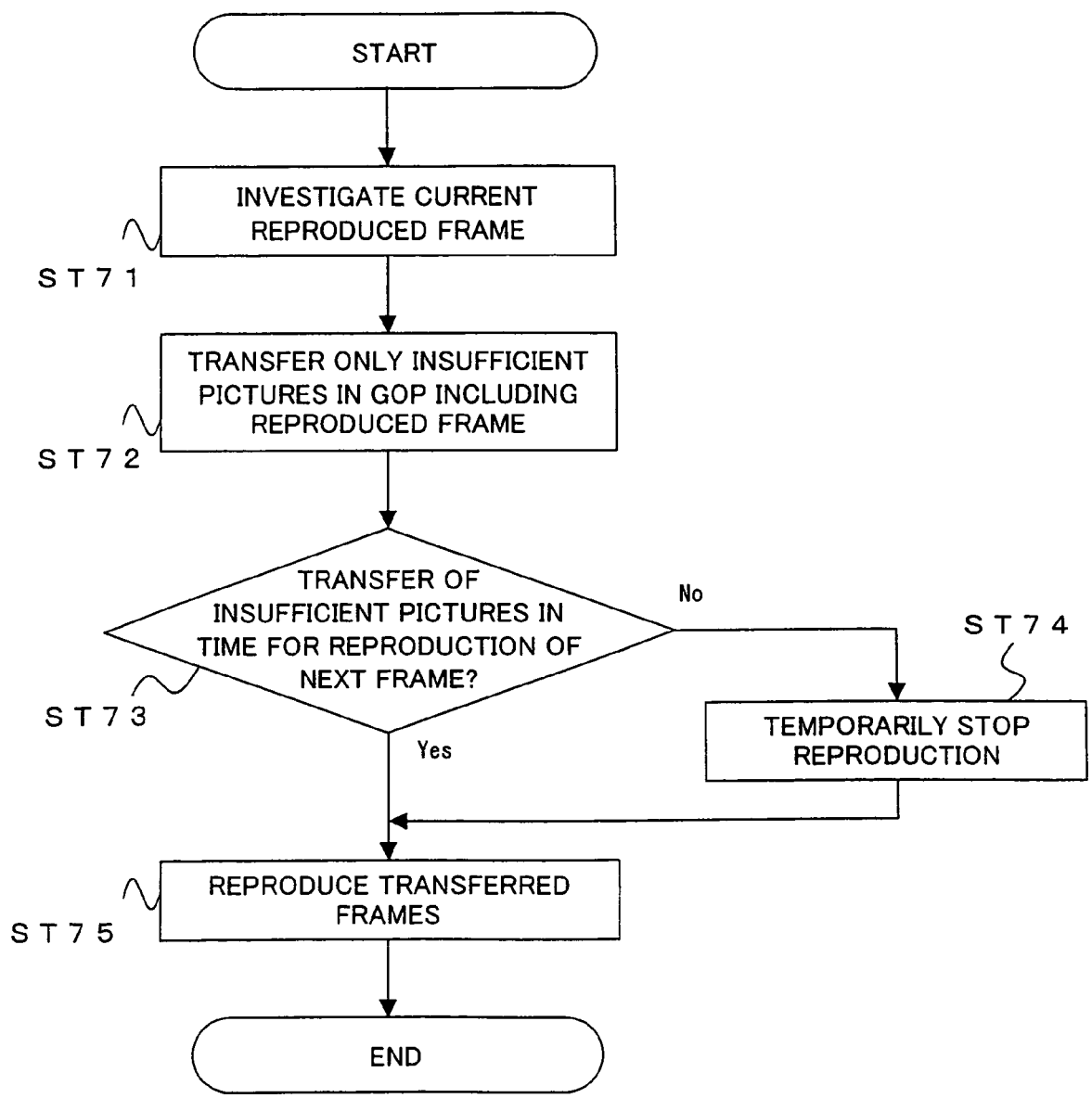
FIG. 14 is a view for explaining a third specific example of the low speed change processing when changing from a reproduction rate higher than a maximum transfer rate to a reproduction rate lower than it at step ST36 shown in FIG. 8.
Figure 15:
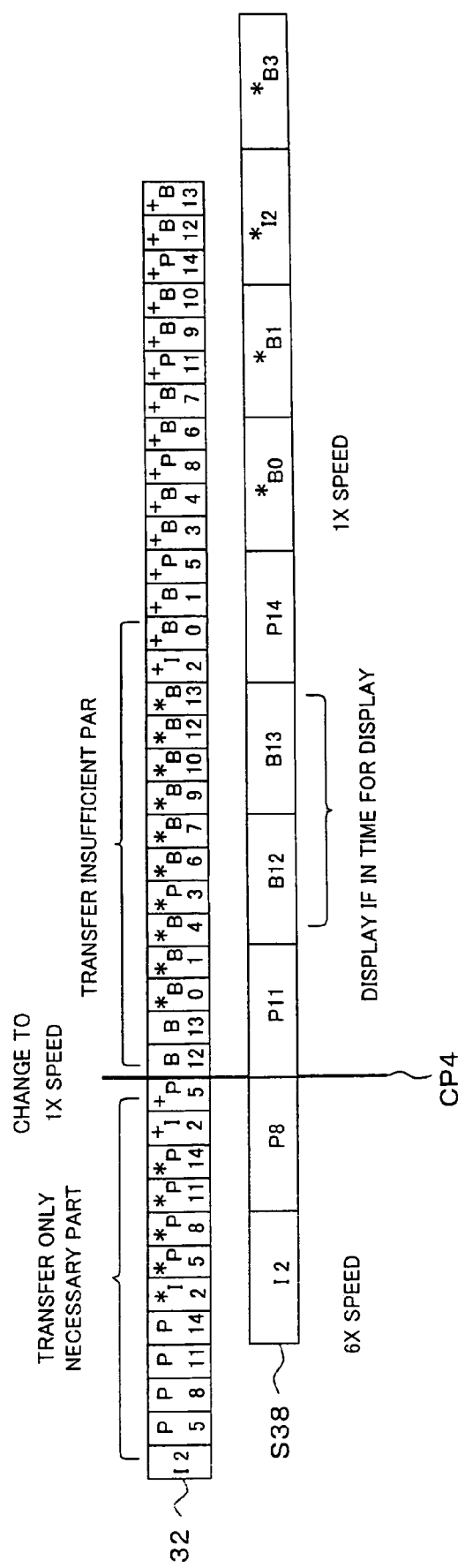
FIG. 15 is a view for explaining a third specific example of processing for low speed change.

FIG. 14 is a flow chart for explaining the third specific example of processing for changing from a reproduction rate faster than the maximum transfer rate to a slower reproduction rate at step ST36 shown in FIG. 8. FIG. 15 is a view for explaining the third specific example of the processing for changing to a slower rate. In FIG. 15, picture data with asterisks attached, picture data with plus marks attached, and picture data with nothing attached indicate picture data included in separate GOPs.

For example, as shown in FIG. 15, the data necessary for 6× speed reproduction is input to the input memory 32.

Below, the steps of the flow chart shown in FIG. 14 will be explained.

Step T71:

The CPU 20 of the computer 2 investigates the current reproduced frame to obtain data relating to the current reproduced frame.

Step ST72:

If the CPU 20 of the computer 2 receives for example at the change point CP4 a command for changing from a reproduction rate faster than the maximum transfer rate to a reproduction rate slower than the maximum transfer rate from the operation device 19, the CPU 20 of the computer 2 outputs to the reproduction apparatus 4 just the insufficient frames of the plurality of picture data (GOP) including the frame being reproduced at the change point CP4. That is, the anchor frames (I and P picture data) are already stored in the input memory 32, so the remaining B picture data is output to the reproduction apparatus 4.

Step ST73:

If the transfer of the insufficient frames at step ST72 is enough for reproduction of the next frame, the CPU 20 proceeds to step ST74, while if not enough, it proceeds to step ST75.

Step ST74:

The CPU 20 of the computer 2 outputs to the reproduction apparatus 4 a command for temporarily stopping the reproduction by the reproduction apparatus 4.

Step ST75:

The CPU 20 of the computer 2 outputs the frame transferred at step ST72 to the reproduction apparatus 4.

In the third specific example, as explained above, the insufficient frames of the GOP including the frame being reproduced are transferred up to when the frame is reproduced at the change point CP4, so if the transfer of insufficient frames is in time for transfer of the next frame after the frame at the change point CP4, it is possible to prevent the display screen from being temporarily stopped and enable reproduction from the change point CP4 at the changed reproduction rate. If the transfer of insufficient frames is not in time, the display screen is temporarily stopped at the frame of the change point CP4, but then reliable reproduction at the changed reproduction rate becomes possible.

Figure 16:
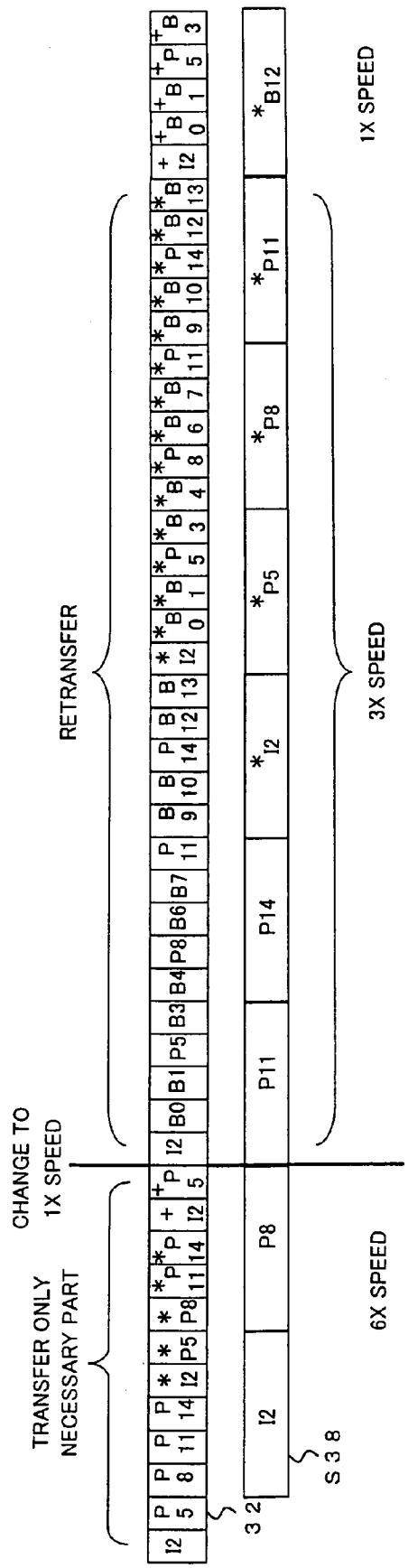
FIG. 16 is a view illustrating the case of reproducing a decoded anchor frame in a first specific example.
Figure 17:
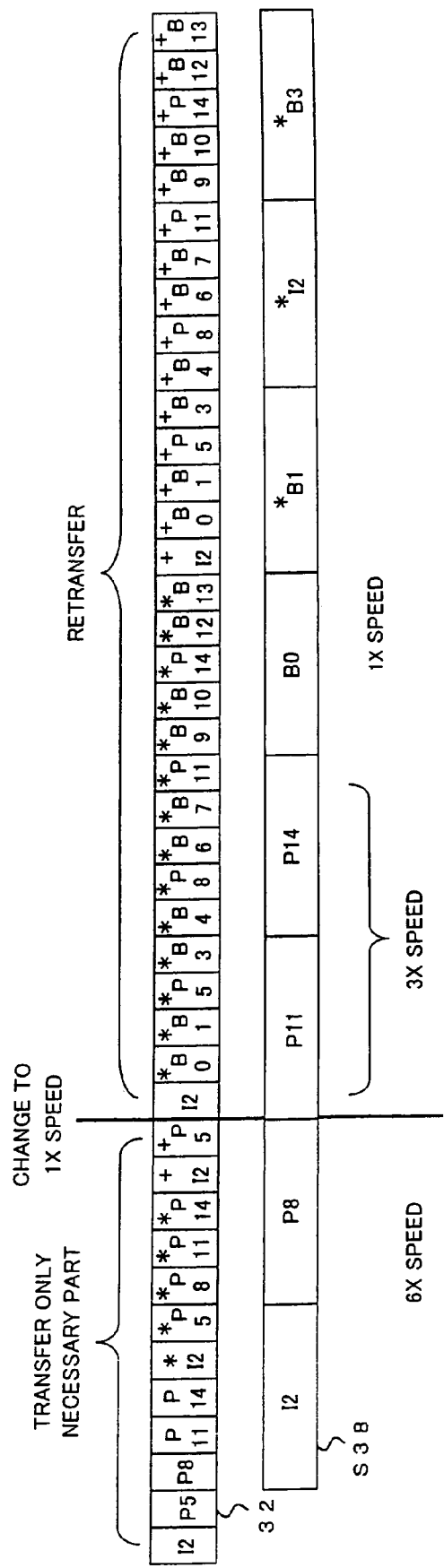
FIG. 17 is a view illustrating the case of reproducing a decoded anchor frame in a second specific example.
Figure 18:
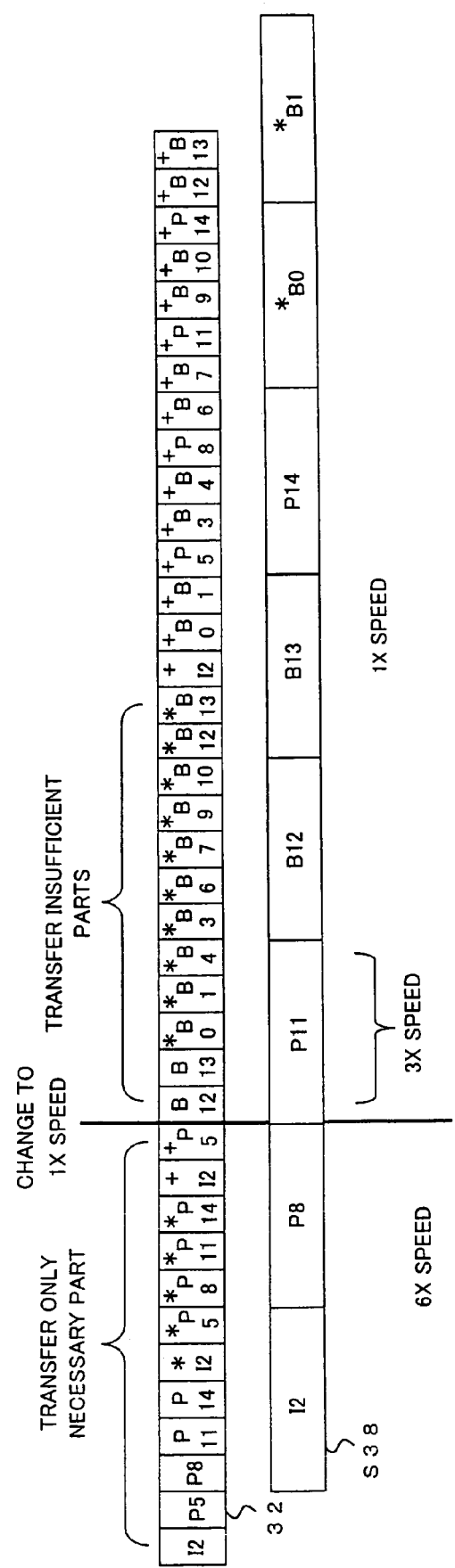
FIG. 18 is a view illustrating the case of reproducing a decoded anchor frame in a third specific example.

Further, in the first to third specific examples, the reproduction was stopped temporarily, but as shown in FIG. 16 to FIG. 18, it is possible to reproduce data without temporarily stopping it by displaying anchor frames already transferred to the input memory 32 and finished being decoded at the reproduction apparatus 4.

FIG. 16 is a view illustrating the case of reproducing decoded anchor frames in the first specific example. FIG. 16 is just one example. Since the GOP including the frame (P8) currently being reproduced is retransferred, in the interval from when a command for change to 1× speed has been issued to when retransfer ends, the anchor frames stored in the memory 32 (P11, P14, *I2, *P5, *P8, *P11) are reproduced at 3× speed and retransfer ends at that speed. Therefore, 1× speed reproduction starts from the next *B12 after *P11. Note that the reason for 3× speed reproduction is that the anchor frames constitute one-third of all of the frames forming the GOP.

FIG. 17 is a view illustrating the case of reproducing decoded anchor frames in the second specific example. FIG. 17 is just one example. Since the next GOP after the GOP including the frame (P8) currently being reproduced is retransferred, after reproduction of the frames (P11, P14) of the GOP including the frame currently being reproduced remaining in the memory ends, the frames (*B0, *B1, *I2, *B3) the next GOP can be quickly reproduced at 1× speed reproduction.

FIG. 18 is a view illustrating case of reproducing decoded anchor frames in the third specific example. FIG. 18 is just one example. Since only anchor frames other than those transferred to the memory 32 in advance are transferred, the time for 3× speed reproduction can be made the shortest among the three specific examples.

Figure 19:
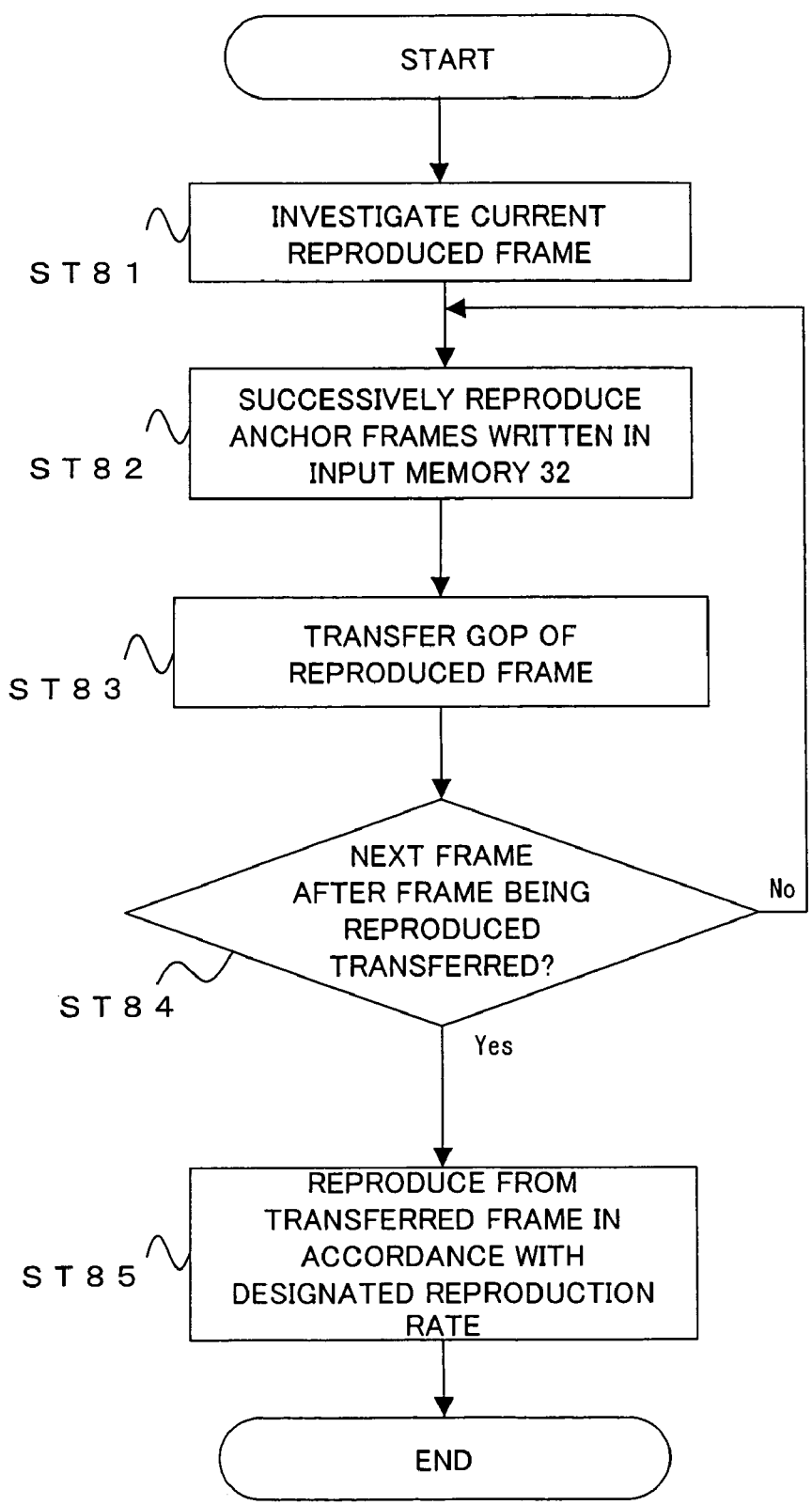
FIG. 19 is a flow chart of the case of reproducing a decoded anchor frame in a first specific example.

Next, an example of the operation in the case of reproducing decoded anchor data in the first specific example shown in FIG. 16 will be explained using the flow chart of FIG. 19.

Step ST81:

The CPU 20 of the computer 2 investigates the current reproduced frame and obtains data relating to the current reproduced frame.

Step ST82:

When the CPU 20 of the computer 2 receives a command from the operation device 19 to change from a reproduction rate faster than the maximum transfer rate to a reproduction rate slower than the maximum transfer rate (in FIG. 16, from 6× speed to 1× speed), it outputs a command for successively reproducing the anchor frames from the input memory 32 to the reproduction apparatus 4. Receiving this command, the CPU 42 of the reproduction apparatus 4 successively reproduces the anchor frames as shown in FIG. 16. In FIG. 16, since only the anchor frames, that is, only one-third of all of the picture data of the GOP, are reproduced, 3× speed reproduction results.

Step ST83:

The CPU 20 of the computer 2 outputs to the reproduction apparatus 4 all of the plurality of picture data forming the reproduced data (GOP) corresponding to the frame being reproduced. The input memory 32 of the reproduction apparatus 4, as shown in FIG. 16, is written with the data input from the computer 2.

Step ST84:

The CPU 20 of the computer 2 judges whether the next frame after the frame being reproduced at the reproduction apparatus 4 has been transferred to the reproduction apparatus 4 for each anchor frame reproduced at step ST82. If judging that it has, it proceeds to step ST85, while if judging otherwise, it returns to step ST82.

Step ST85:

When the next frame after the frame being reproduced has been transferred to the reproduction apparatus 4 at step ST84, the CPU 20 of the computer 2 outputs a command for reproduction from the next frame after the frame being reproduced by the designated reproduction rate (in FIG. 16, 1× speed) through the bridge 18 and PCI bus 6 to the reproduction apparatus.

In the same way, in the second specific example, instead of clearing the buffer of the input memory 32 at step ST62 of FIG. 12, the anchor frames stored in the input memory 32 are reproduced at 3× speed until the next GOP after the frame being reproduced at step ST63 ends and then, when transfer ends, 1× speed reproduction is started. In the same way, in the third specific example as well, instead of temporarily stopping reproduction at step ST74 of FIG. 14, a command for reproducing the anchor frames stored in the input memory 32 by a regular order is output to the reproduction apparatus 4. Further, at step ST75, when transfer ends, 1× speed reproduction is started.

As shown in FIG. 16 to FIG. 18, the second specific example requires less frames in 3× speed reproduction than the first specific example and the third specific example requires less than the second specific example.

Figure 20:
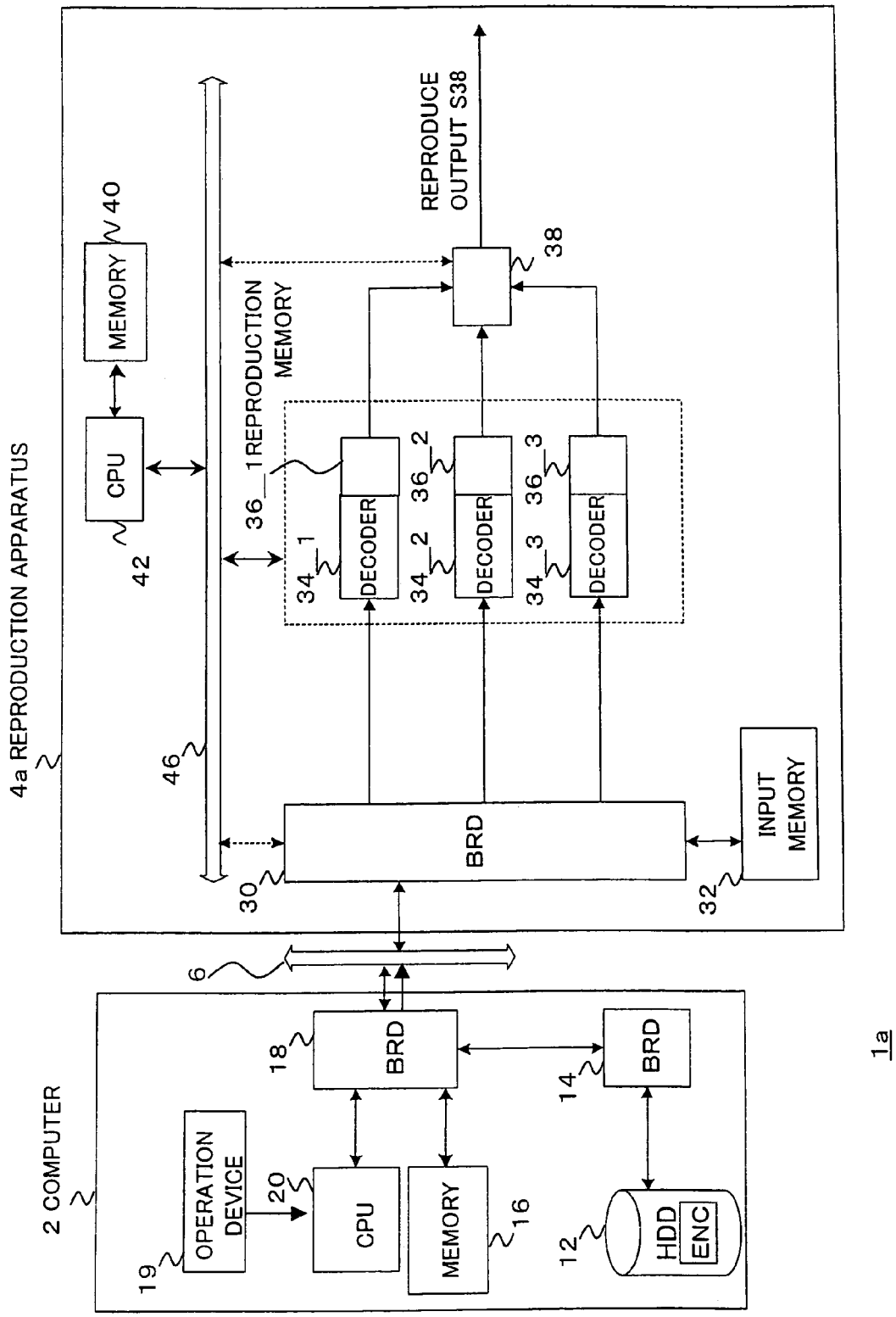
FIG. 20 is a view for explaining a modification of the data processing system according to the embodiments of the present invention.

FIG. 20 is a view for explaining a modification of the data processing system according to the embodiments of the present invention. The data processing system 1a of this embodiment uses a plurality of decoders for the reproduction apparatus 4a, for example, as shown in FIG. 20, the decoders 34_1 to 34_3. Only the points of difference will be explained.

The reproduction apparatus 4a, for example, has a PCI bridge 30, an input memory 32, decoders 34_1 to 34_3, reproduction memories 36_1 to 36_3, a selector 38, a control memory 40, a CPU 42, and a control bus 46.

The decoders 34_1, 34_2, 34_3, under the control of the CPU 42, decode the picture data read through the PCI bridge 30 to the input memory 32 by the MPEG scheme and write the results in reproduction memories 36_1 to 36_3. Specifically, the decoders 34_1, 34_2, and 34_3, under the control of the CPU 42, decode the I picture data read from the input memory 32 without referring to the decoding results of the other picture data. Further, the decoders 34_1, 34_2, and 34_3, under the control of the CPU 42, decode the P picture data read from the input memory 32 while referring to the I or P picture data positioned in the past in terms of time and with decoding results stored in the reproduction memories 36_1 to 36_3. Further, the decoders 34_1, 34_2, and 34_3, under the control of the CPU 42, decode the B picture data read from the input memory 32 while referring to the decoding results of the I or P picture data positioned before or after it in terms of time and with decoding results stored in the reproduction memories 36_1 to 36_3.

The decoders 34_2 and 34_3 have the same configurations as the decoder 34_1. They decode the image data input via the PCI bridge 30 by the MPEG scheme and write the results in their respective reproduction memories 36_2 and 36_3. That is, the decoders 34_1, 34_2, 34_3 perform decoding at a high speed by performing the decoding by dispersed processing in accordance with need.

The selector 38, under the control of the CPU 42, switches and selectively reproduces and outputs as the picture data S38 the picture data after decoding read from the reproduction memories 36_1, 36_2, and 36_3.

The rest of the operation is substantially the same as the above embodiments, so its explanation will be omitted.

As explained above, according to the data processing system 1, when a command for change of the reproduction rate from a high speed to a low speed is output, picture data output from the computer 2 to the reproduction apparatus 4 in advance is used to start reproduction at an intermediate reproduction rate and during that time the insufficient amount is output from the computer 2 to the reproduction apparatus 4. Therefore, after a command for change of the reproduction rate from a high speed to a low speed is output, reproduction at the changed low speed can be performed smoothly in a short time. The above effect is particularly remarkable when the picture data is of a high definition (HD) image or other image with a large amount of data or when employing a long GOP with a greater number of picture data in each GOP compared with a usual GOP. That is, when the picture data is of an HD image, the occurrence of a change in speed from a high speed to a low speed causes a large penalty in retransmission of picture data from the computer 2 to the reproduction apparatus 4. According to the data processing system 1, as explained above, when a speed change command from a high speed to a low speed occurs, reproduction at a speed between them is immediately possible. Further, with I, P, B, or other picture data using reference structures, a speed change from high speed to low speed results in time being taken until all the picture data required for decoding next is assembled. This tendency becomes particularly great when employing a long GOP. In this embodiment, as explained above, the plurality of picture data required right after a speed change can be held at the reproduction apparatus 4 under certain conditions.

The present invention is not limited to the above embodiments. Further, in the above embodiments, as the encoding scheme, the MPEG was illustrated, but the invention may be similarly applied to the H.264/AVC (Advanced Video Coding) etc.

In the above embodiments, the case where compressed picture data was stored in the HDD 12 was explained, but the present invention is not limited to this, for example, can also be applied to storage through an input/output interface etc. on an optical disk, magneto-optic disk, semiconductor memory, magnetic disk, or other various storage media. Further, the mode of connection is not limited to connection through cables etc. For example, connection by other types of connection modes such as connection by wires or wirelessly from the outside is also possible.

Further, in the above embodiments, the case of performing a series of processing by hardware having those functions was explained, but the present invention is not limited to this. Use of software for this is also possible. At this time, when performing a series of processing by software, various types of functions may be realized by installing various programs into the computer in which the program forming that software is built into to dedicated hardware. For example, it is installed in a general use personal computer etc. from for example a storage medium. Further, the storage medium for example includes an optical disk, magneto-optic disk, semiconductor memory, magnetic disk or other various storage media needless to say. Further, for example, it is also possible to install various types of programs in a general personal computer etc. for example by downloading them through the Internet or other networks.

Further, in the above embodiments, the reproduction rate is not particularly limited. The invention may be broadly applied to specific processing of the reproduction apparatus at any variable speed reproduction operations.

Note that in the above embodiments, the CPU 20 of the computer 2 judges whether the reproduction rate by the reproduction apparatus 4 was slower than the maximum transfer rate and performed processing based on the result of judgment, but the invention is not limited to this. For example, the CPU 20 may also make the above judgment based on a transfer rate depending on the device or a preset transfer rate.

Further, the block configurations of the embodiments are examples of the block configurations. The invention is not limited to the illustrated examples.

Further, by suitably providing a group of read flags indicating if the data read from the HDD 12 is valid for the compressed and encoded data stored in the HDD 12, a group of decode flags indicating validity at the time of scheduling of decoding, a group of display flags indicating validity at scheduling for display of the decoded data, etc. as metadata and automatically updating the series of flag groups in accordance with reproduction speed and direction, scheduling can be managed. At this time, the past series of scheduling using variable speed reproduction processing and update information of the groups of flags may be managed as separate scheduling metadata (history information). This may in accordance with need be described as syntax in the compressed and encoded data or separately stored in a storage medium such as the HDD 12.

Further, the number of the decoders, the number of the banks, the decoder IDs, etc. may also be managed as metadata (component history information). Further, the reproduction rate, reproduction direction, etc. may also be managed as metadata (reproduction history information). At this time, the metadata may if necessary be described as syntax in the compressed and encoded data or separately stored in a storage medium such as the HDD 12. By referring to such metadata (history information), it is possible to reuse scheduling performed in the past and further to perform scheduling faster and more accurately. Note that this metadata may also be comprised so as to be managed at an outside apparatus as for example a database.

Note that, in the above embodiments, the present invention can also be applied to a case when the decoder 34_1 (34_2 and to 34_3) does not completely decode the compressed and encoded data stored on the HDD 12 (decode it up the middle). Specifically, for example, the present invention may also be applied to a case where the decoder 34_1 (34_2 and to 34_3)

only performs decoding for variable length encoding and inverse quantization and does not perform inverse DCT, a case where it performs inverse quantization, but does not perform decoding for variable length encoding, etc. In such a case, for example, the decoders (34_2 and 34_3) may generate history information indicating for example up to what stage of encoding and decoding (for example, stage of inverse quantization) they performed processing for and output this linked with the incompletely decoded data.

Further, in the above embodiments, the HDD 12 stored incompletely encoded data (for example, data for which DCT and quantization were performed, but for which variable length encoding was not performed) and, in accordance with need, history information of the encoding and decoding, but the present invention may also be applied to the case where the decoders (34_3 and 34_3) can decode incompletely encoded data supplied under the control of the CPU 20 and convert it to a baseband signal. Specifically, the present invention can also be applied to the case where the decoder 34_1 (34_2 and 34_3) for example performs inverse DCT and inverse quantization for data to which DCT and quantization have been applied, but variable length encoding has not been applied and does not perform decoding for variable length encoding. Further, in such a case, for example, the CPU 20 may obtain the history information of encoding and decoding stored in the HDD 12 linked with the incompletely encoded data and schedule the decoding by the decoder 34_1 (34_2 and 34_3) based on that information.

Further, in the above embodiments, the HDD 12 stored the incompletely encoded data and, in accordance with need, history information of encoding and decoding, but the present invention may also be applied to the case where the decoder 34_1 (34_2 and 34_3) does not completely decode the incompletely encoded data supplied under the control of the CPU 20 (decodes it only to an intermediate stage). Further, in such a case as well, for example, the CPU 20 may obtain the history data of encoding and decoding stored in the HDD 12 linked with the incompletely encoded data and schedule the decoding by the decoder 34_1 (34_2 and 34_3) based on this information. Further, in this case as well, the decoders 34_1 to 34_3 may generate history information of encoding and decoding in accordance with need and output it linked with the incompletely decoded data. In other words, the present invention may also be applied to the case where the decoder 34_1 (34_2 and 34_3) performs partial decoding under the control of the CPU 20 (executes part of the steps of the decoding). The CPU 20 may obtain the history information of the encoding and decoding stored in the HDD 12 linked with the incompletely encoded data and schedule the decoding by the decoder 34_1 (34_2 and 34_3) based on the information. The decoder 34_1 (34_2 and 34_3) may also generate history information of encoding and decoding in accordance with need and output it linked with the incompletely encoded data.

Further, the HDD 12 may further store information on the history of encoding and decoding processing linked with the compressed and encoded stream data, and the CPU 20 may schedule the decoding of the compressed and encoded stream data based on the information on the history of the encoding processing and the decoding processing. Further, even when the decoder 34_1(34_2 and 34_3) can decode the compressed and encoded stream data and convert it to a baseband signal under the control of the CPU 20, it is possible to generate the information on the history of encoding and decoding in accordance with need and enable it to be output linked with the baseband signal.

Note that in the above embodiments, the reproduction apparatus 4 was explained as having a plurality of decoders, but the present invention can also be applied to the case of a single decoder. At this time, the single decoder may not only receive, decode, and display or output the compressed and encoded data, but may also, in the same way as explained above, receive the compressed and encoded data, partially decode it up to an intermediate stage, and output it to the outside along with history information of encoding and decoding, receive partially encoded data, decode it, and convert it to a baseband signal for output to the outside, or receive partially encoded data, partially decode it to an intermediate stage, and output it to the outside along with history information of the encoding and decoding.

Further, in the above embodiments, the CPU 20 and CPU 42 were configured separately, but the invention is not limited to this. For example, the CPU 20 and CPU 42 may also conceivably be configured by a single CPU controlling the reproduction apparatus 4 as a whole. Further, even when the CPU 20 and CPU 42 are configured independently, the CPU 20 and CPU 42 may also be formed on a single chip.

Further, when the CPU 20 and CPU 42 are configured independently, it is possible to make at least part of the processing performed by the CPU 20 in the above embodiments be performed for example by time division by the CPU 42 or to make at least part of the processing performed by the CPU 42 be performed by for example time division by the CPU 20. The CPU 20 and CPU 42 may also be realized using processors able to perform dispersed processing.

Further, for example, the reproduction apparatus 4 may be configured to be able to be connected to a network and, in the above embodiments, at least part of the processing performed by the CPU 20 or CPU 42 may be performed at the CPU of another apparatus connected through the network. Similarly, in the above embodiments, the memories 32, 40, etc. were configured separately, but the invention is not limited to this. These memories may conceivably also be configured by a single memory in the reproduction apparatus 4.

Further, in the above embodiments, the case of the HDD 12, the decoders 34_1 to 34_3, and the selector 38 being connected via bridges and buses and made integral as a reproduction apparatus was explained, but the present invention is not limited to this. For example, the invention may also be applied to the case where part of these components are connected by wires or wirelessly from the outside and the case where these components are connected to each other in other various modes of connection.

Further, in the above embodiments, the case of the compressed stream data being stored in an HDD was explained, but the present invention is not limited to this. For example, the invention may also be applied to the case of reproducing and processing stream data stored on an optical disk, magneto-optic disk, semiconductor memory, magnetic disk, or other various storage media.

Further, in the above embodiments, the CPU 42, memory 32, memory 40, the decoder 34_1(34_2 and 34_3), and the selector 38 were mounted on the same expansion card (for example, PCI card or PCI-Express card), but the invention is not limited to this. For example, PCI-Express or other technology may be used to mount these components on separate expansion cards when the speed of transfer between cards is high.

Further, in this specification, a "system" means a logical collection of a plurality of apparatuses. It does not matter if the apparatuses of the different configurations are in the same housing or not.

The present invention may be applied to a system for reproducing reproduced data.

It should be understood by those skilled in the art that various modifications, combinations, sub-combinations, and alterations may occur depending on design requirements and other factors insofar as they are within the scope of the appended claims or the equivalents thereof.

We claim:

1. A data processing apparatus for outputting a plurality of picture data forming reproduced data to a reproduction apparatus for reproduction, said data processing apparatus comprising:

a processing circuit which judges whether a reproduction rate of said picture data by said reproduction apparatus is slower than a transfer rate for transferring said picture data to said reproduction apparatus and outputs all of the picture data forming said reproduced data to said reproduction apparatus when said processing circuit judges that said reproduction rate is slower than said transfer rate, and if said processing circuit judges that said reproduction rate is faster than said transfer rate, said processing circuit outputs to said reproduction apparatus less than all of said picture data forming said reproduced data able to be transferred at said transfer rate in accordance with said reproduction rate among all of the plurality of picture data forming said reproduced data, wherein in response to a command to change from a first reproduction rate faster than said transfer rate to a second reproduction rate slower than said transfer rate received by the processing circuit, said processing circuit outputs to said reproduction apparatus data other than picture data already written in an input memory of said reproduction apparatus in the picture data forming said reproduced data including picture data being reproduced, and causes said reproduction apparatus to reproduce said reproduced data at said second reproduction rate when the output of said data other than picture data already written in said input memory is enough for reproduction of a next picture data in the picture data being reproduced, and if the output of said data other than picture data already written in said input memory is not enough for reproduction of the next picture data in the picture data being reproduced, said processing circuit causes said reproduction apparatus to reproduce said reproduced data at said second reproduction rate when said output is ended.

2. The data processing apparatus as set forth in claim 1, wherein said plurality of picture data forming said reproduced data includes a first picture data where decoding results of said reproduction apparatus are referred to in decoding of other picture data and a second picture data where decoding results are not referred to in decoding of other picture data, and when said processing circuit judges that said reproduction rate is faster than said transfer rate, said processing circuit outputs to said reproduction apparatus said first picture data with priority over said second picture data in accordance with said reproduction rate among the said plurality of picture data forming said reproduced data.

3. The data processing apparatus as set forth in claim 2, including as said first picture data I picture data decoded without referring to the decoding results of other picture data and P picture data decoded referring to the decoding results of other picture data, including as said second picture data B picture data decoded referring to the decoding results of other picture data, and when said processing circuit judges that said reproduction rate is faster than said transfer rate, said processing circuit outputs to said reproduction apparatus on a priority basis the I picture data, P picture data, and B picture data in that order among the plurality of picture data forming said reproduced data.

4. The data processing apparatus as set forth in claim 1, wherein said processing circuit writes said picture data in the input memory of said reproduction apparatus and decodes and reproduces the picture data written into said input memory by a designated reproduction rate.

5. The data processing apparatus as set forth in claim 1, wherein when writing said picture data into the input memory of said reproduction apparatus, said processing circuit generates management information to be referred to when said reproduction apparatus reads said picture data from said input memory for reproduction and outputs said generated management information to said reproduction apparatus.

6. The data processing apparatus as set forth in claim 1, wherein said processing circuit judges that the reproduction rate of said picture data by said reproduction apparatus is slower than a maximum transfer rate of transfer of said picture data to said reproduction apparatus and, the processing circuit outputs all of the picture data forming said reproduced data to said reproduction apparatus.

7. The data processing apparatus as set forth in claim 1, wherein said processing circuit temporarily stops the reproduction by said reproduction apparatus in response to the output of said data other than picture data already written in said input memos not being enough for reproduction of the next picture data in the picture data being reproduced.

8. A data processing method outputting a plurality of picture data forming reproduced data to a reproduction apparatus for reproduction, said data processing method of a data processing apparatus comprising:

judging, at the data processing apparatus, whether a reproduction rate of said picture data by said reproduction apparatus is slower than a transfer rate of transfer of said picture data to said reproduction apparatus;

outputting, at the data processing apparatus, all of the picture data forming said reproduced data to said reproduction apparatus when the judging determines that said reproduction rate is slower than said transfer rate;

in response to said judging determining that said reproduction rate is faster than said transfer rate, outputting, at the data processing apparatus, to said reproduction apparatus less than all of said picture data forming said reproduced data able to be transferred at said transfer rate in accordance with said reproduction rate among all of the plurality of picture data forming said reproduced data; and receiving, at the data processing apparatus, a command to change from a first reproduction rate faster than said transfer rate to a second reproduction rate slower than said transfer rate;

outputting, at the data processing apparatus, to said reproduction apparatus data other than picture data already written in an input memory of said reproduction apparatus in the picture data forming said reproduced data including picture data being reproduced; and causing said reproduction apparatus to reproduce said reproduced data at said second reproduction rate when the output of said data other than picture data already written in said input memory is enough for reproduction of a next picture data in the picture data being reproduced, and if the output of said data other than picture data already written in said input memory is not enough for reproduction of the next picture data in the picture data being reproduced, causing said reproduction apparatus to reproduce said reproduced data at said second reproduction rate when said output is ended.

9. A data processing system comprising:
a computer data processing apparatus that outputs a plurality of picture data forming reproduced data; and
a reproduction apparatus which receives the reproduced data, wherein
said computer data processing apparatus judges whether a reproduction rate of said picture data by said reproduction apparatus is slower than a transfer rate when outputting said picture data to said reproduction apparatus and outputs all of the picture data forming said reproduced data to said reproduction apparatus when the result of said judgment is that said reproduction rate is slower than said transfer rate, and if said reproduction rate is faster than said transfer rate, said computer data processing apparatus outputs to said reproduction apparatus less than all of said picture data forming said reproduced data able to be transferred at said transfer rate in accordance with said reproduction rate among all of the plurality of picture data forming said reproduced data, and
said reproduction apparatus includes,
an input memory, and
a processor that writes said picture data input from said data processing apparatus to said input memory, decodes said picture data read from said input memory, and reproduces decoded picture data,
wherein in response to a command to change from a first reproduction rate faster than said transfer rate to a second reproduction rate slower than said transfer rate received by the computer data processing apparatus, said computer data processing apparatus outputs to said reproduction apparatus data other than picture data already written in the input memory of said reproduction apparatus in the picture data forming said reproduced data including picture data being reproduced, and causes said reproduction apparatus to reproduce said reproduced data at said second reproduction rate when the output of said data other than picture data already written in said input memory is enough for reproduction of a next picture data in the picture data being reproduced, and if the output of said data other than picture data already written in said input memory is not enough for reproduction of the next picture data in the picture data being reproduced, said computer data processing apparatus causes said reproduction apparatus to reproduce said reproduced data at said second reproduction rate when said output is ended.

10. The data processing system as set forth in claim 9, wherein
said data processing apparatus outputs a command indicating a designated reproduction rate by said reproduction apparatus, and
said processor decodes said picture data read from said input memory and reproduces it at said designated reproduction rate in accordance with said command input from said data processing apparatus.

11. A data processing apparatus outputting a plurality of picture data forming reproduced data to a reproducing means for reproduction, comprising:
a storage means for storing said reproduced data;
a processing circuit which judges whether a reproduction rate of said picture data by said reproducing means is slower than a transfer rate at the time of outputting said picture data read from said storage means to said reproducing means and outputs all of the picture data forming said reproduced data to said reproducing means when the result of said judgment is that said reproduction rate is slower than said transfer rate, wherein when said processing circuit judges that said reproduction rate is faster than said transfer rate, said processing circuit outputs to said reproducing means less than all of said picture data forming said reproduced data able to be transferred at said transfer rate in accordance with said reproduction rate among all of the plurality of picture data forming said reproduced data,
wherein in response to a command to change from a first reproduction rate faster than said transfer rate to a second reproduction rate slower than said transfer rate received by the processing circuit, said processing circuit outputs to said reproduction apparatus data other than picture data already written in an input memory of said reproduction apparatus in the picture data forming said reproduced data including picture data being reproduced, and causes said reproduction apparatus to reproduce said reproduced data at said second reproduction rate when the output of said data other than picture data already written in said input memory is enough for reproduction of a next picture data in the picture data being reproduced, and if the output of said data other than picture data already written in said input memory is not enough for reproduction of the next picture data in the picture data being reproduced, said processing circuit causes said reproduction apparatus to reproduce said reproduced data at said second reproduction rate when said output is ended; and
the reproducing means for writing picture data output from said processing circuit into the input memory, decoding said picture data read from said input memory, and reproducing said picture data.

12. A non-transitory computer readable storage medium encoded with instructions, which when executed by a data processing apparatus causes the data processing apparatus to implement a method for outputting a plurality of picture data forming reproduced data to a reproduction apparatus for reproduction, said method comprising:
judging, at the data processing apparatus, whether a reproduction rate of said picture data by said reproduction apparatus is slower than a transfer rate of transfer of said picture data to said reproduction apparatus;
outputting, at the data processing apparatus, all of the picture data forming said reproduced data to said reproduction apparatus when the judging determines that said reproduction rate is slower than said transfer rate;
in response to said judging determining that said reproduction rate is faster than said transfer rate, outputting, at the data processing apparatus, to said reproduction apparatus less than all of said picture data forming said reproduced data able to be transferred at said transfer rate in accordance with said reproduction rate among all of the plurality of picture data forming said reproduced data; and
receiving, at the data processing apparatus, a command to change from a first reproduction rate faster than said transfer rate to a second reproduction rate slower than said transfer rate;
outputting, at the data processing apparatus, to said reproduction apparatus data other than picture data already written in an input memory of said reproduction apparatus in the picture data forming said reproduced data including picture data being reproduced; and causing said reproduction apparatus to reproduce said reproduced data at said second reproduction rate when the output of said data other than picture data already written in said input memory is enough for reproduction of a next picture data in the picture data being reproduced, and if the output of said data other than picture data already written in said input memory is not enough for reproduction of the next picture data in the picture data being reproduced, causing said reproduction apparatus to reproduce said reproduced data at said second reproduction rate when said output is ended.

* * * * *